(12) United States Patent
Glassman

(10) Patent No.: US 10,828,905 B2
(45) Date of Patent: Nov. 10, 2020

(54) PRESSURE CONTROL SYSTEM FOR PRINT HEAD

(71) Applicant: Stratasys Ltd., Rehovot (IL)

(72) Inventor: Barak Glassman, Nes Ziona (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 16/474,081

(22) PCT Filed: Dec. 13, 2017

(86) PCT No.: PCT/IB2017/057878
§ 371 (c)(1),
(2) Date: Jun. 27, 2019

(87) PCT Pub. No.: WO2018/122655
PCT Pub. Date: Jul. 5, 2018

(65) Prior Publication Data
US 2019/0337298 A1 Nov. 7, 2019

Related U.S. Application Data

(60) Provisional application No. 62/439,950, filed on Dec. 29, 2016.

(51) Int. Cl.
*B41J 2/17* (2006.01)
*B41J 2/175* (2006.01)
*B41J 2/165* (2006.01)

(52) U.S. Cl.
CPC ....... *B41J 2/17556* (2013.01); *B41J 2/16508* (2013.01); *B41J 2/16526* (2013.01); *B41J 2/17596* (2013.01)

(58) Field of Classification Search
None
See application file for complete search history.

(56) References Cited

U.S. PATENT DOCUMENTS

| 6,259,962 B1 | 7/2001 | Gothait |
|---|---|---|
| 6,569,373 B2 | 5/2003 | Nepadensky |

(Continued)

FOREIGN PATENT DOCUMENTS

| CN | 1214012 | 4/1999 |
|---|---|---|
| CN | 101115623 | 1/2008 |

(Continued)

OTHER PUBLICATIONS

Office Action dated Oct. 31, 2019 From the Israel Patent Office Re. Application No. 267723 and Its Translation Into English. (5 Pages).

(Continued)

*Primary Examiner* — Erica S Lin

(57) ABSTRACT

A pressure controlling system for an inkjet printer includes a pressure chamber, a pump fluidically connected to the chamber and adapted for increasing or decreasing the pressure within the pressure chamber, a controllable three port two way valve, and a sensing unit including one or more pressure sensors. The pressure sensing unit is in fluidic communication with the pressure chamber for sensing the pressure therein. The valve has a first port controllably fluidically connectable to the pressure chamber, a second port controllably fluidically connectable to an inkjet print head, and a third port controllably fluidically connectable with atmospheric air. The sensing unit is adapted for sending signals representative of the pressure within the pressure chamber to at least one processor/controller. The pump and the valve are controlled by receiving control signals from the processor/controller(s). There are provided a method for operating the system and a printer including the system.

32 Claims, 9 Drawing Sheets

(56) References Cited

U.S. PATENT DOCUMENTS

| | | | |
|---|---|---|---|
| 6,658,314 | B1 | 12/2003 | Gothait |
| 6,850,334 | B1 | 2/2005 | Gothait |
| 7,183,335 | B2 | 2/2007 | Nepadensky |
| 7,209,797 | B2 | 4/2007 | Kritchman et al. |
| 7,225,045 | B2 | 5/2007 | Gothait et al. |
| 7,300,619 | B2 | 11/2007 | Nepadensky et al. |
| 7,364,686 | B2 | 4/2008 | Kritchman et al. |
| 7,500,846 | B2 | 3/2009 | Eshed et al. |
| 7,658,976 | B2 | 2/2010 | Kritchman |
| 7,962,237 | B2 | 6/2011 | Kritchman |
| 8,781,615 | B2 | 7/2014 | Kritchman et al. |
| 9,031,680 | B2 | 5/2015 | Nepadensky |
| 2004/0004653 | A1* | 1/2004 | Pryor .................... B22F 3/1055 347/106 |
| 2007/0046742 | A1* | 3/2007 | Inoue ................... B41J 2/17506 347/85 |
| 2008/0198207 | A1* | 8/2008 | Katada ..................... B41J 2/175 347/85 |
| 2009/0219323 | A1 | 9/2009 | Silverbrook et al. |
| 2010/0295905 | A1* | 11/2010 | Tamaki ................... B41J 2/175 347/85 |
| 2011/0279495 | A1 | 11/2011 | Kuribayashi et al. |
| 2013/0040091 | A1 | 2/2013 | Dikovsky et al. |
| 2015/0035186 | A1 | 2/2015 | Teken et al. |
| 2015/0375518 | A1 | 12/2015 | Sugitani et al. |
| 2016/0052259 | A1 | 2/2016 | Sugitani et al. |

FOREIGN PATENT DOCUMENTS

| | | |
|---|---|---|
| CN | 201253993 | 6/2009 |
| CN | 102555501 | 7/2012 |
| CN | 202293673 | 7/2012 |
| CN | 203792722 | 8/2014 |
| CN | 204095297 | 1/2015 |
| CN | 104428137 | 3/2015 |
| CN | 104626403 | 5/2015 |
| CN | 205800525 | 12/2016 |
| GB | 2113615 | 8/1983 |
| JP | 2016-043529 | 4/2016 |
| TW | 200938379 | 9/2009 |
| WO | WO 2006/064036 | 6/2006 |
| WO | WO 2018/122655 | 7/2018 |

OTHER PUBLICATIONS

International Preliminary Report on Patentability dated Jul. 11, 2019 From the International Bureau of WIPO Re. Application No. PCT/IB2017/057878. (9 Pages).

International Search Report and the Written Opinion dated Mar. 14, 2018 From the International Searching Authority Re. Application No. PCT/IB2017/057878. (16 Pages).

Notification of Office Action and Search Report dated Apr. 24, 2020 From the State Intellectual Property Office of the People's Republic of China Re. Application No. 201780083896.6 and Its Translation Into English. (17 Pages).

* cited by examiner

PRESSURE CONTROL SYSTEM FOR PRINT HEAD

RELATED APPLICATIONS

This application is a National Phase of PCT Patent Application No. PCT/IB2017/057878 having International filing date of Dec. 13, 2017, which claims the benefit of priority under 35 USC § 119(e) of U.S. Provisional Patent Application No. 62/439,950 filed on Dec. 29, 2016. The contents of the above applications are all incorporated by reference as if fully set forth herein in their entirety.

FIELD AND BACKGROUND OF THE INVENTION

The present invention, in some embodiments thereof, relates to inkjet printers, more particularly, but not exclusively, to a system for controlling pressure applied to an inkjet print head.

Inkjet printing technology is currently used for many applications. For example, 2D inkjet printers (for printing a pattern on a page or other flat or non-flat surfaces) is extensively used in desktop printing application for domestic, office, and industrial printing applications. Recently, 2D inkjet technology has been applied to printing various types of entire electrical circuits and/or discrete electrical components (including, electrical conductors, resistors, capacitors, transistors, diodes, and other electrical components) on selected 2D surfaces by using inks comprising organic materials suitable for the manufacturing of organic electronic components.

Inkjet technology may also be adapted for use in 3D printers capable of producing defined 3D objects. Additive manufacturing (AM) is generally a process in which a 3D object is manufactured utilizing a computer model of the object. Such a process is used in various fields, such as design related fields for purposes of visualization, demonstration and mechanical prototyping, as well as for rapid manufacturing.

The basic operation of any AM system consists of slicing a 3D computer model into thin cross sections, translating the result into two-dimensional position data and feeding the data to a controller of a system that constructs a 3D structure in a layer-wise manner.

AM entails many different approaches to the method of fabrication, including 3D printing, e.g., 3D inkjet printing, stereolithography, laminated object manufacturing, fused deposition modeling and others.

In 3D printing processes, for example, a building material is dispensed from a printing block including one or more printing heads. Each of the printing heads has a set or array of nozzles from which material can be selectively dispensed onto a printing tray to form one layer of a 3D object at a time. Depending on the building material, the layers may then be cured or solidified using a suitable device also carried on the printing block. The building material may include modeling material, which forms the object, and support material, which supports the object as it is being built. The printing block scans the supporting structure and patterns it. Various 3D printing techniques exist and are disclosed in, e.g., U.S. Pat. Nos. 6,259,962, 6,569,373, 6,658,314, 6,850,334, 7,183,335 7,209,797, 7,225,045, 7,300,619, 7,364,686, 7,500,846, 7,658,976, 7,962,237, 8,781,615 and 9,031,680, and U.S. Application Publication Nos. 20130040091 and 20150035186, all of the same Assignee, the contents of which are incorporated herein by reference.

Inkjet print heads (of both 2D and 3D printers) have a unique set of requirements for proper operation. One such requirement is the application of negative pressure (defined herein as a pressure lower than the atmospheric pressure in the print head environment) to the ink inside the print head in order to avoid "weeping" of ink at the print head nozzle orifices. Another requirement is associated with cleaning the print head nozzle orifices in order to avoid or reduce clogging of the orifices and/or nozzles of the print head by debris and/or solidified ink accumulating at such orifices/nozzles.

This may be achieved by purging the print head by temporarily applying positive pressure (defined herein as a pressure higher than the atmospheric pressure in the print head environment) to the ink inside the print head. Such a pulse of positive pressure forces an amount of ink to flow from the print head's internal ink reservoir through the orifices/nozzles, which cleans the orifices/nozzles and prevents clogging. Such print head purging may be performed periodically by the printer and/or may be performed on beginning a print job, and/or may even be a user initiated "on demand" purging.

The amount of ink ejected from the orifices/nozzles during such purging action is wasted. It is therefore desirable to perform the purging by providing a steep step-like function increase of the inkjet print head pressure so as to minimize the time of application of positive pressure to the print head, in order to reduce the amount of ink wasted during purging.

When the negative pressure needs to be applied and maintained in a print head, a low capacity pump may adequately perform such negative pressure maintenance. However, when a positive pressure pulse or step-like function pressure increase is needed, it may be difficult to achieve by a low capacity pump and may therefore require the use of a more expensive high capacity pump.

Additionally, once the positive pressure surge has been achieved and purging is completed, there is a need to reduce the pressure in the print head as fast as possible to reach the operating negative pressure level suitable to prevent weeping. This may also be difficult to achieve swiftly enough by using a low capacity pump and may also require the use of an expensive high capacity pump.

The need for supplying variable pressure levels for performing various actions of the print head has been addressed in different ways in prior art inkjet print heads. For example, U.S. Pat. No. 6,302,516 to Brooks et al. discloses an ink supply system for an inkjet print head. The ink supply system includes a vacuum reservoir connected to a vacuum pump and to a restricted passage and a purge reservoir connected to an air pump and another restricted passage.

Chinese Patent No. CN104626403 (A) to Huang Xiang Feng discloses a light-cured 3D printing material supply fluid path system.

Chinese Patent No. CN204095297(U) to Li Xiaoping discloses an ink viscosity self-adaptive code spraying printer.

There is an ongoing need for systems for efficiently and cost-effectively controlling the pressure applied to an inkjet print head and for performing fast pressure changes.

SUMMARY OF THE INVENTION

The present application discloses a system for controlling the pressure applied to a print head or print heads of an inkjet printer.

An aspect of some embodiments of the pressure control system is that the pressure control system includes a pump usable for print head purging by producing a positive pressure in the internal ink reservoir of a print (or of multiple print heads) and for producing a negative pressure within the internal ink reservoir(s) of the print head(s) to avoid weeping through the print head's orifices or nozzles.

The pump fluidically communicates with a pressure chamber and the pressure chamber is in fluidic communication with a two way/three port valve having a first port controllably fluidically connectable to the pressure chamber, a second port controllably fluidically connectable to the print head internal ink reservoir(s) or to a print head pressure manifold (in case of multiple print heads being connected to the pressure controlling system through a manifold) and a third port controllably fluidically connectable to the atmosphere surrounding the print head(s). The pressure controlling system includes a pressure sensor unit including one or several pressure sensors. The pressure sensor unit is in fluidic communication with the pressure chamber and senses the pressure within the pressure chamber. The pressure sensor unit is adapted for sending signals representative of the pressure within said pressure chamber to at least one processor/controller, and the pump is adapted to receive control signals from the processor/controller(s) for controlling the operation of the pump. The valve is adapted for receiving control signals from the processor/controller(s) for controlling the operation of the valve.

In accordance with some embodiments, the processor/controller unit(s) may be at least one processor/controller included in the pressure controlling system and adapted to control the operation of the valve and the pump. The processor/controller(s) may also be adapted to communicate with at least a second processor/controller controlling the operation of one or more print heads of the printer to receive command signals from the second processor/controller and (optionally) to send status signals to the second processor/controller(s).

In accordance with some embodiments, there is at least one processor/controller included in the printer that is adapted to control the operation of the pressure controlling system and the operation of one or more print heads of the printer.

In accordance with some embodiments, there is a combination of at least one processor/controller included in the pressure controlling system and at least one processor/controller included in the printer and communicating with the at least one processor/controller of the pressure controlling system. The combination is adapted for operating the pump and the valve and for controlling the operation of one or more print heads of the printer.

In accordance with some embodiments of the pressure controlling system, the pressure controlling system also includes a filter fluidically connected between the pump and the atmospheric air for filtering air entering the pump.

In accordance with some embodiments of the pressure controlling system, the second port of the valve is fluidically connected to one or more inkjet print heads by a hollow conduit for controlling the pressure within the print head(s) and the pressure controlling system also includes an ink backflow detecting sensor for detecting backflow of ink from the inkjet print head(s) through the hollow conduit before the ink enters the second port.

In accordance with some embodiments of the pressure controlling system, the hollow conduit is a transparent hollow conduit and the ink backflow detecting sensor is an optical sensor.

In accordance with some embodiments of the pressure controlling system, the pump is a reversible peristaltic pump which may pump air into or out of the pressure chamber.

In accordance with some embodiments of the pressure controlling system, the pump includes a stepper motor.

In accordance with some embodiments of the pressure controlling system, the pressure sensing unit may be a pressure sensing unit disposed within the pressure chamber, and In accordance with some embodiments of the pressure controlling system, the pressure sensing unit is a pressure sensing unit disposed outside the pressure chamber and fluidically connected to the pressure chamber through one or more hollow conduits connected to the pressure sensor(s).

In accordance with some embodiments of the pressure controlling system, the pressure sensing unit includes multiple pressure sensors, each pressure sensor of the multiple pressure sensors is adapted for sensing pressure in a sub-range of the full range of pressures achievable within the pressure chamber for increasing the dynamic range and/or the resolution of the pressure sensing unit.

In accordance with some embodiments of the pressure controlling system, the three port two way valve is a solenoid valve.

In accordance with some embodiments of the pressure control system, the pump is a bidirectional or reversible pump capable of pumping a fluid or gas in two opposite directions.

In accordance with some embodiments of the pressure control system, the peristaltic pump is a variable speed pump.

The present application also provides an inkjet printer including the pressure controlling system as disclosed herein and at least one controllably movable inkjet print head. The print head(s) is/are fluidically connected to the pressure controlling system for controlling the pressure level within at least one internal ink reservoir disposed within said print head(s).

In accordance with some embodiments of the printer, the at least one processor/controller of the pressure controlling unit is at least one processor/controller included in the pressure controlling system and adapted to control the operation of the valve and of the pump. The at least one processor/controller is also adapted to communicate with at least a second processor/controller controlling the operation of at least one print head of the printer, for receiving command signals from the at least second processor/controller and for (optionally) sending status signals to said at least second processor/controller.

In accordance with some embodiments of the printer, the at least one processor/controller is included in the printer and is adapted to control the operation of the pressure controlling system and to control the operation of the at least one print head of the printer.

In accordance with some embodiments of the printer, the printer includes a combination of at least one processor/controller included in said pressure controlling system and at least one processor/controller included in the printer and communicating with the at least one processor/controller of the pressure controlling system. The combination is adapted for operating the pump and the valve and for controlling the operation of the at least one print head of the printer.

In accordance with some embodiments of the printer, the pressure controlling system also includes a filter fluidically connected between the pump and the atmospheric air for filtering air entering the pump.

In accordance with some embodiments of the printer, the second port of the valve is fluidically connected to the at least one inkjet print head by a hollow conduit for controlling the pressure within the at least one print head and the pressure controlling system also includes an ink backflow detecting sensor for detecting backflow of ink from the at least one inkjet print head through the hollow conduit before the ink enters the second port.

In accordance with some embodiments of the printer, the hollow conduit is a transparent hollow conduit and the ink backflow detecting sensor is an optical sensor.

In accordance with some embodiments of the printer, the pump is a reversible peristaltic pump.

In accordance with some embodiments of the printer, the pump includes a stepper motor.

In accordance with some embodiments of the printer, the pressure sensor unit is a pressure sensor unit disposed within the pressure chamber.

In accordance with some embodiments of the printer, the pressure sensor unit is disposed outside the pressure chamber and fluidically connected to the pressure chamber through one or more hollow conduits connected to the one or more pressure sensors.

In accordance with some embodiments of the printer, the pressure sensor unit includes multiple pressure sensors. Each pressure sensor of the multiple pressure sensors is adapted for sensing pressure in a sub-range of the full range of pressures achievable within the pressure chamber for increasing the dynamic range and/or the resolution of the pressure sensing unit.

In accordance with some embodiments of the printer, the three port two way valve is a solenoid valve.

In accordance with some embodiments of the printer, the pump is a bidirectional or reversible pump capable of pumping a fluid or gas in two opposite directions.

In accordance with some embodiments of the printer, the peristaltic pump is a variable speed pump.

In accordance with some embodiments of the printer, the ink jet printer is a 2D inkjet printer or a 3D inkjet printer.

There is also provided a method for controlling pressure in a print head of an inkjet printer comprising the pressure controlling system disclosed herein. The method includes the steps of, receiving pressure related signals from the pressure sensing unit of the pressure controlling system, the pressure related signals represent the pressure level within the pressure chamber, receiving printing control signals for operating the print head and processing the pressure related signals and/or the control signals to provide pump control signals to the pump and/or valve control signals to the valve.

In accordance with some embodiments of the method, the step of processing includes the steps of, receiving a vacuum mode control signal, closing the valve to fluidically connect the print head(s) to the atmosphere and to disconnect the pressure chamber from the atmosphere, operating the pump to reduce the pressure within the pressure chamber to a vacuum mode pressure level, and opening the valve to fluidically connect the print head(s) to the pressure chamber.

In accordance with some embodiments of the method, the vacuum mode pressure level is a set or preset pressure value.

In accordance with some embodiments of the method, the step of operating the pump includes the step of closing the valve to allow the pressure within the inner spaces of the print block (or print blocks if there are more than one print block) to equilibrate with atmospheric pressure prior to the step of operating said pump.

In accordance with some embodiments of the method, the step of processing includes, receiving a purging control signal for performing purging of the print head(s), closing the valve to allow the pressure within the print head(s) to equilibrate with atmospheric pressure, operating the pump to increase the pressure within the pressure chamber to a purge pressure level, and opening the valve to fluidically disconnect the print head(s) from the atmosphere and to fluidically connect the pressure chamber to the print head(s), for purging the print head(s).

In accordance with some embodiments of the method, the purge pressure value is a set or preset value.

In accordance with some embodiments of the method, the vacuum pressure value and the purge pressure value are determined from the volume within the pressure controlling system and the total volume included within the print head(s) and the hollow conduit(s) connecting the print head(s) to the pressure controlling system.

In accordance with some embodiments of the method, the vacuum pressure value and the purge pressure value are determined and set for each different combination of the pressure controlling system and one or more print heads.

In accordance with some embodiments of the method, the step of processing also includes reversing the direction of pumping of the pump after the purging is completed to reduce the pressure within the pressure chamber to a level equal to or smaller than the vacuum mode pressure level.

In accordance with some embodiments of the method, the step of processing also includes the step of checking if ink backflow is detected and if ink backflow has been detected operating the pump to increase pressure within the pressure chamber for preventing ink from entering the pressure controlling system.

In accordance with some embodiments of the method, the step of checking also includes the step of disabling the pump after preventing ink from entering the pressure controlling system.

In accordance with some embodiments of the method, the step of checking also includes the step of outputting an ink backflow message.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawing, in which like components are designated by like reference numerals. With specific reference now to the drawings in detail, it is stressed that the particulars shown are by way of example and for purposes of illustrative discussion of embodiments of the invention. In this regard, the description taken with the drawings (in which like components are designated by like reference numbers) makes apparent to those skilled in the art how embodiments of the invention may be practiced.

In the drawings.

DETAILED DESCRIPTION OF SPECIFIC EMBODIMENTS OF THE INVENTION

Figure 1:
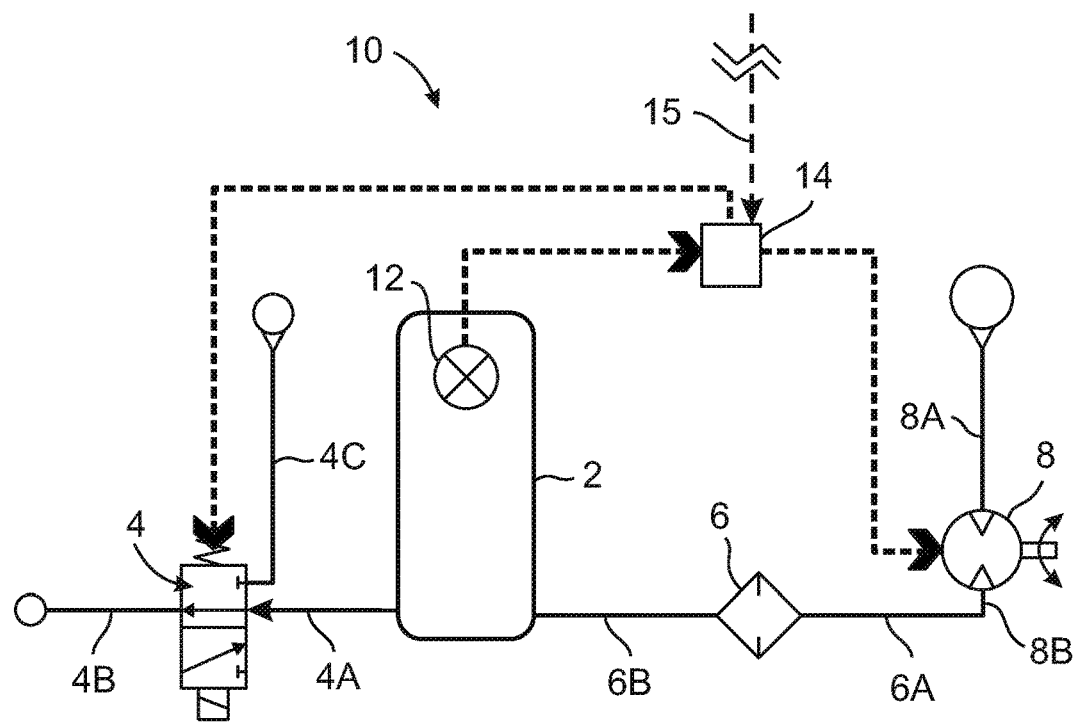
FIG. 1 is a schematic diagram illustrating a pressure controlling system in accordance with an embodiment of the pressure controlling systems of the present application.

Abbreviations:

The following abbreviations are used throughout the present application:

AM=Additive manufacturing.
ATM=Atmosphere (pressure unit).
2D=two dimensional.
3D=three dimensional.
DSP=Digital signal processor.
DOD=Drop on demand.
IC=Integrated circuit.
mm=millimeter.
NO 3/2 valve=normally open three port two way valve.
NC 3/2 valve=normally closed three port two way valve.
PCB=Printed circuit board.
PSI=Pounds per square inch.
SEC=Seconds.
S/N=Signal to noise ratio.
TTL=Transistor Transistor Logic.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

It is expected that during the life of a patent maturing from this application many relevant devices and systems for pumping fluids will be developed and the scope of the terms "pump" and "pumps" are intended to include all such new technologies a priori. It is also expected that during the life of a patent maturing from this application many relevant inkjet print heads for printing will be developed and the scope of the terms "print head", Print heads "inkjet print head" and "inkjet print heads" are intended to include all such new technologies a priori.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Reference is now made to FIG. 1, which is a schematic diagram illustrating a pressure controlling system in accordance with an embodiment of the pressure controlling systems of the present application. The pressure controlling system 10 includes a pressure chamber 2, a three port/two way valve 4, a filter 6, a bidirectional (reversible) pump 8 having a first pump port 8A and a second pump port 8B, a pressure sensor unit 12 and a processor/controller 14. The pressure sensor unit 12 is disposed within the pressure chamber 2 for sensing the pressure within the pressure chamber 2. The pressure sensor unit 12 may include one or more pressure sensors (not shown in detail in FIG. 1 for the sake of clarity of illustration).

The pressure chamber 2 is fluidically connected to the pump 8 through a filter 6 which is interposed between the pressure chamber 2 and the pump 8. The filter 6 is fluidically connected to the second pump port 8B by a hollow conduit 6A. The filter 6 is fluidically connected to the pressure chamber 2 by a hollow conduit 6B. The pump 8 has a first pump port 8A which opens to the atmospheric air outside the pressure controlling system 10 and a second pump port 8B which is connected to the filter 6 and fluidically communicates with the pressure chamber 2 through the filter 6.

The filter 6 is a filter adapted for filtering the external atmospheric air which enters the pump 8 through the first pump port 8A. The filter 6 removes dust or any other particulate matter or moisture droplets or any other contaminants from the air entering through the first pump port 8A of the pump 8 to reduce the amount of contaminants entering the volume enclosed within the pressure chamber 2 which reduces clogging of any of the fluidic passages of the pressure controlling system 10 and also reduces carryover of any such contaminants into any print head fluidically connected to the system 10. The pressure chamber 2 is also connected to the valve 4.

The valve 4 has three ports. A first port 4A of the valve 4 is controllably fluidically connectable to the pressure chamber 2. A second port 4B of the valve 4 is controllably fluidically connectable to an inkjet print head (the print head is not shown in FIG. 1 but see FIGS. 3 and 4 hereinafter). A third port 4C of the valve 4 is controllably fluidically connectable with atmospheric air. The three port/two way valve 4 may be any suitable type of controllable three port two way valve known in the art, such as, for example, a three port/two way normally open solenoid valve. In FIG. 1, the valve 4 is implemented as a normally open three port two way valve (NO 3/2 valve), and is illustrated in the open state (when the valve 4 is de-energized). In the open state, the valve 4 fluidically connects between the first port 4A and the second port 4B and fluidically disconnects the third port 4C from the atmospheric air. In the open state, a print head (not shown in FIG. 1) connected to the port 4B is in fluidic communication with the pressure chamber 2.

In the closed state of the valve 4 when the valve 4 is energized (not shown in FIG. 1), the second port 4B is fluidically disconnected from the first port 4A and the first port 4A is fluidically connected to the third port 4C. In the closed state of the valve 4, a print head (not shown in FIG. 1) connected to the second port 4B of the valve 4 is fluidically disconnected from the pressure chamber 2 and is fluidically connected to the atmospheric air through the third port 4C, resulting in a fast increase of the pressure inside the print head to atmospheric pressure.

The pump 8 may be operated in two different operational modes. In a first operational mode (vacuum mode), the pump 8 is operated to withdraw the air from the vacuum chamber such that the air in the pressure chamber 2 is pumped out of the pressure chamber 2 through the filter 6 and the port 8B into the pump 8 and out of the port 8A out into the atmosphere. In this mode of operation, the pump 8 reduces the pressure within the pressure chamber 2 resulting in a partial vacuum (negative pressure) within the pressure chamber 2. If the valve 4 is in the open state, the pressure within a print head fluidically connected to the second port 4B will also be a negative pressure. In the first operational mode (vacuum mode), when the valve 4 is in the open state, the pump 8 may be operated at a low speed to maintain the negative pressure at a relatively stable negative pressure level for avoiding weep at the orifices of the print head.

In a second operational mode (purging mode), the pump 8 is operated to pump atmospheric air from the atmosphere through the port 8A into the second pump port 8B and through the filter 6 into the pressure chamber 2. In the purging mode of operation, the pump 8 increases the pressure within the pressure chamber 2 to reach a pressure level which is larger than the atmospheric pressure level. Typically, during the initial part of the purging mode, the valve 4 is in the closed state such that the pressure chamber 2 is fluidically disconnected from the print head, and the print head is fluidically connected to the atmospheric air through the third port 4C. The pump 8 may then be operated at a high speed to raise the pressure within the pressure chamber to a preset purging pressure which is larger than the atmospheric pressure.

The exact value of the preset purging pressure to be achieved within the pressure chamber 2 is determined, inter alia, by the internal volume of space within the specific print head or print heads that are connected to the pressure controlling system 10 and by the ratio of the volume within the print head(s) to the volume of the pressure chamber 2, as will be disclosed in more detail hereinafter. Once the pressure within the pressure chamber 2 has reached the preset purging pressure, the valve 4 may be opened to fluidically connect the pressure chamber 2 with the print head(s) (while at the same time fluidically disconnecting the print head(s) from the atmosphere) to perform the purging of the print head(s). After the valve 4 is opened, the pump 8 may be operated at high speed to maintain the purging pressure for a preset period of time sufficient to perform the purging.

It will be appreciated that the closing of the valve 4 for performing purging results in a more rapid pressure increase in the print head, because the time required for pressure equalization of the head(s) with atmospheric pressure is substantially shorter than the time it would have taken the low capacity pump 8 had it been operated to pump air into the pressure chamber 2 without closing the valve 4 to reach atmospheric pressure within the total combined volume within the print head(s) and the pressure chamber 2. Additionally, since after closing of the valve 4, the pump 8 has to raise the pressure to the desired purging pressure only within the internal volume of the pressure chamber and since the pump 8 may continue to operate at maximal speed after the valve 4 is opened again to perform purging, the total time needed to reach the required purging pressure within the print head(s) is reduced (as compared to the time required to reach the same required purging pressure had the pump been operated to increase pressure in the print head(s) without closing the valve 4). This advantageously results in a faster rate of pressure increase which results in a steeper, faster and more "step-like" function of the pressure increase as a function of time.

After purging is completed, the valve 4 may be closed again to fluidically disconnect the print head(s) from the pressure chamber 2 and to fluidically connect the print head(s) to atmospheric air resulting in the pressure within the printing head(s) equalizing with atmospheric pressure through the third port 4C. At this stage the printer may perform a wiping of the print head(s)' orifice plate to clean the orifice plate after purging by using any wiping method or wiping mechanism as is well known in the art of inkjet printing.

It is noted that the wiping of the orifice plate of inkjet print head is preferably performed when the pressure within the internal ink reservoir(s) of the print head(s) is at atmospheric pressure in order to efficiently wipe the orifice plate. If wiping is performed while the pressure within the internal ink reservoirs of the print head(s) is higher than atmospheric pressure, ink may still be pushed through the orifices resulting in ink smearing and a less efficient wiping. If wiping is performed when the pressure within the internal ink reservoir(s) of the print head(s) is negative (i.e. is lower than the atmospheric pressure some of the ink purged from the orifices as well as particulate matter adhering to the surface of the orifice plate may be sucked into the orifices by the wiping action which may result in orifice clogging. Thus, when wiping the orifice plate(s) with the print block at atmospheric pressure sucking back the ink drop(s) to the print head with any particulate matter or potential orifice clogging with debris expelled from the orifices during the purging is prevented or reduced.

It is noted that the closing of the valve 4 results in rapid reaching of atmospheric pressure within the internal cavities and/or passages of the print head (such as, for example, internal ink reservoir(s) and or any manifolds attached thereto, for more details see FIG. 7 hereinafter) which advantageously allows the rapid performing of wiping of the print head under atmospheric pressure (as compared to the slower reaching of atmospheric pressure in prior art systems). Therefore, the valve configuration disclosed in the pressure controlling systems of the present application may be advantageously used to rapidly dissipate the purging pressure from the print head(s) after purging by venting the pressurized air from the printing head(s) into the atmosphere through the third port 4C of the valve 4 as disclosed hereinabove, which advantageously allows faster performing of wiping of the orifice plate of the print head(s) under proper pressure conditions for wiping.

After closing the valve 4 to perform the wiping, the pump 8 may be activated in the first mode (vacuum mode) to lower the pressure within the pressure chamber 2 to produce and maintain a negative pressure within the pressure chamber 2 while the print head(s) are being wiped. This advantageously utilizes the time period required for wiping to enable a faster return to the negative pressure required for printing (as compared to a hypothetical situation in which the pump 8 may have been operated to reduce the pressure within the combined volumes of the pressure chamber 2 and of the print head(s) after wiping is completed and the valve 4 being opened after print head wiping is completed). This faster return to the operating negative pressure level reduces the print head(s)' idle time and advantageously improves the overall printing speed.

The controlling of the operation of the pressure controlling systems of the present application is typically performed by one or more processor/controllers. In the exemplary embodiment of the pressure controller system 10, the processor/controller 14 that controls the operation is implemented as a dedicated processor/controller which is a dedicated processor/controller physically disposed (together with any associated electronic circuitry) on or in the pressure controlling system 10. The processor/controller 14 may be any type of processing and/or controlling unit known in the art.

For example, the processor/controller unit may be a microprocessor, a microcomputer, a digital signal processor (DSP), a microcontroller, or any other type of device capable of receiving and processing data from sensors or from any other devices, receiving command and/or control signals from other devices (such as, for example, from another controller/processor(s) and outputting control and/or command signals to other device (such as, for example, the valve 4 and the pump 8)). The processor/controller 14 may be a digital device or an analog device or a hybrid analog/digital device, as is known in the art. The processor/controller 14 may be an integrated circuit (IC) and may be implemented to include any required discrete or integrated support circuitry disposed within or outside of the inkjet printer) as is known in the art. For example, the processor/controller 14 may be suitably included in a printed circuit board (PCB) (not shown in FIG. 1 for the sake of clarity of illustration, but see FIG. 5 hereinafter). The processor/controller 14 may also include any type of memory device(s) necessary for storing data, if such data storage is required for operating.

The processor/controller 14 is suitably electrically coupled to any pressure sensor(s) included in the pressure sensor unit 12 and is configured to receive from the pressure sensor(s) signal representing the pressure within the pressure chamber 2. It is noted that the individual pressure sensors included in the pressure sensor unit 12 are not shown in detail in FIG. 1 for the sake of clarity of illustration. The processor/controller 14 is also electrically connected to the pump 8 and may send to the pump 8 pump control signals for controlling the operation thereof. The pump control signals may control the direction of pumping (either pumping air into the pressure chamber 2 to increase the pressure within the pressure chamber 2 or pumping air out of the pressure chamber 2 to reduce the pressure therein) and/or the rate of pumping of the pump 8.

The processor/controller 14 is also suitably electrically connected to the valve 4 for controlling the operation thereof. In the exemplary embodiment of the pressure control system 10 of FIG. 1, in which the valve 4 is a NO3/2 valve, the control signals may include an energizing signal applying a suitable voltage to the electrical terminals of the valve 4 for closing the valve 4 to switch the valve 4 into the closed state and not applying any voltage to the terminals of the valve 4 in order to maintain the valve 4 in the open state (the open and closed states of the valve 4 may be as disclosed in detail hereinabove).

The processor/controller 14 may be suitably connected to a processor/controller (not shown in FIG. 1) operating the printer within which the pressure controlling system 10 is included by a communication line 15, for receiving command signals from the printer's processor/controller. Typically, such command signals may include a "purge signal" instructing the pressure control system 10 to perform a purge sequence of steps required for purging the print head(s) and a "vacuum signal" instructing the pressure control system to perform a sequence of steps required for returning the pressure within the print head(s) to the negative pressure required for preventing weeping.

In some embodiments of the pressure controlling systems of the present application the communication line 15 may (optionally) be a bidirectional communication line for providing signals (such as status signals) and/or data to the processor/controller (not shown in FIG. 1) operating the printer. Such data may include, among others, pressure level data obtained from the pressure sensor unit 12, signals or data from an ink backflow detector (if present, such as in the exemplary embodiment of the pressure controlling system 30 of FIG. 3 hereinafter) or other data.

It is noted that while the exemplary embodiment of the pressure controlling unit 10 of FIG. 1 preferably uses a normally opened three port two way valve, this is not obligatory and a suitable normally closed three port two way valve (NC 3/2 valve) may also be used with suitable adaptation of the control software or firmware. The configuration of such an embodiment using an NC 3/2 valve will be apparent to the person skilled in the art and is therefore not disclosed in detail hereinafter. Briefly, if the pressure control system uses a NC3/2 valve, the processor controller controlling the valve may apply an opening signal (such as, for example a positive voltage) in order to hold the valve in the opened state while no such signal may be required to maintain the valve at the closed state.

Figure 2:
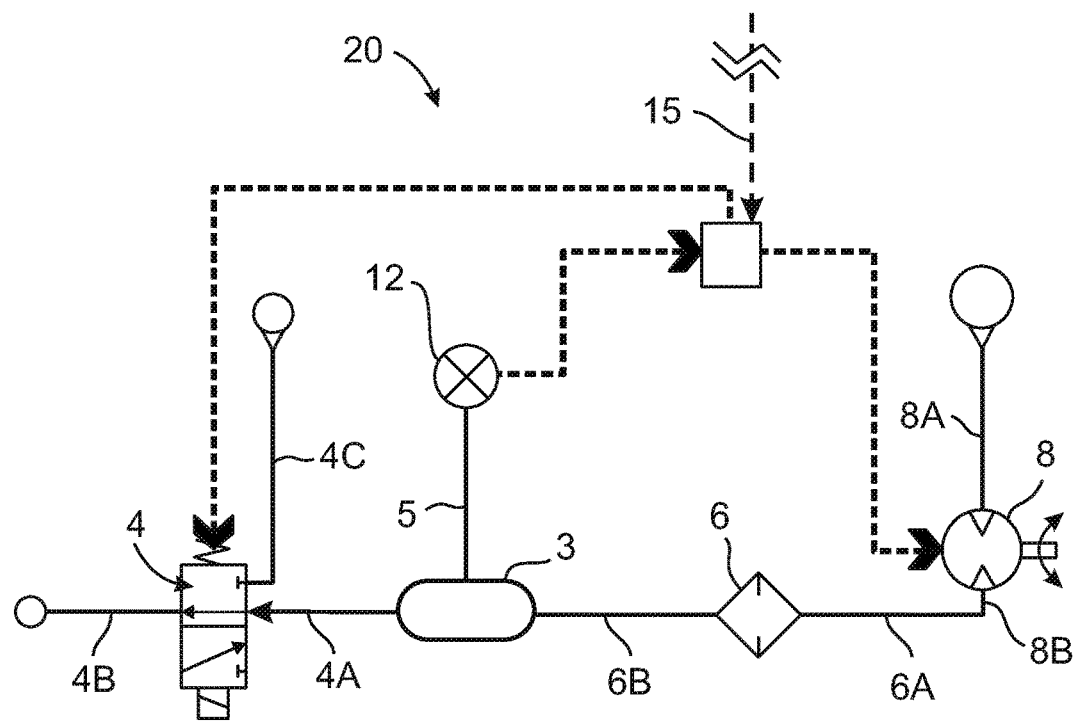
FIG. 2 is a schematic diagram illustrating a pressure controlling system in accordance with another embodiment of the pressure controlling systems of the present application.

Reference is now made to FIG. 2, which is a schematic diagram illustrating a pressure controlling system in accordance with another embodiment of the pressure controlling systems of the present application.

The pressure controlling system 20 includes a pressure chamber 3, a three port/two way valve 4, a filter 6, a bidirectional (reversible) pump 8, a pressure sensor unit 12 and a processor/controller 14. The pressure controlling system 20 is similar in construction and operation to the system 10 of FIG. 1, except that, while in the pressure controlling system 10 (of FIG. 1) the pressure sensor unit 12 is disposed within the pressure chamber 2, the pressure sensor unit 12 of the pressure controlling system 20 (of FIG. 2) is disposed outside of the pressure chamber 3 and is fluidically connected to the internal space within the pressure chamber 3 by one or more suitable hollow conduits 5.

The pressure chamber 3 may be similar in volume and shape to the pressure chamber 2 of FIG. 1, except that it has suitable openings therein for connecting the hollow conduit(s) 5 such that the hollow conduit(s) 5 fluidically connect any of the pressure sensor(s) of the pressure sensor unit 12 to the internal volume of the pressure chamber 3. In some embodiments of the pressure controlling system 20, the pressure sensor unit 12 may include two (or, optionally, more than two) different sensors with each pressure sensor having a different pressure working range for increasing and improving the dynamic range and sensitivity of the pressure sensor unit 12. Such an exemplary embodiment is disclosed in detail with respect to FIGS. 4-6 hereinafter.

An advantage of the configuration of the pressure controlling system 20 is that it allows the use of relatively large pressure sensor(s) to be used without excessively reducing the internal volume of the pressure chamber 3. Another advantage of the configuration of the pressure controlling system 20 is that any pressure sensors included in the pressure sensor unit 12 may be disposed in any location in or on the system 20 which allows placement of such pressure sensor(s) close to the processor/controller 14, reducing the length of any electrical connections from the processor/controller 14 to the sensor(s) and allowing for better shielding of any electrical pressure related signals in such electrical connections which may improve the signal to noise ratio (S/N) of the pressure related signals. The pressure controlling system illustrated in FIGS. 4-5 hereinafter discloses an exemplary embodiment of the system 20 in detail.

The construction and operation of the valve 4 the processor/controller 14, the pump 8, and the filter 6 are as disclosed in detail hereinabove with respect to the pressure controlling system 10 of FIG. 1.

The processor/controller 14 of the pressure controlling system 20 may be suitably connected to a processor/controller (not shown in FIG. 2) operating the printer within which the pressure controlling system 10 is included by a communication line 15, for receiving command signals from the printer's processor/controller. Typically, such command signals may include a "purge signal" instructing the pressure control system 10 to perform a purge sequence of steps required for purging the print head(s) and a "vacuum signal" instructing the pressure control system to perform a sequence of steps required for returning the pressure within the print head(s) to the negative pressure required for preventing weeping.

In some embodiments of the pressure controlling systems of the present application the communication line 15 may (optionally) be a bidirectional communication line for providing signals (such as status signals) and/or data to the processor/controller (not shown in FIG. 2) operating the printer. Such data may include, among others, pressure level data obtained from the pressure sensor unit 12, signals or data from an ink backflow detector (if present, such as in the exemplary embodiment of the pressure controlling system 30 of FIG. 3 hereinafter) or other data.

Figure 3:
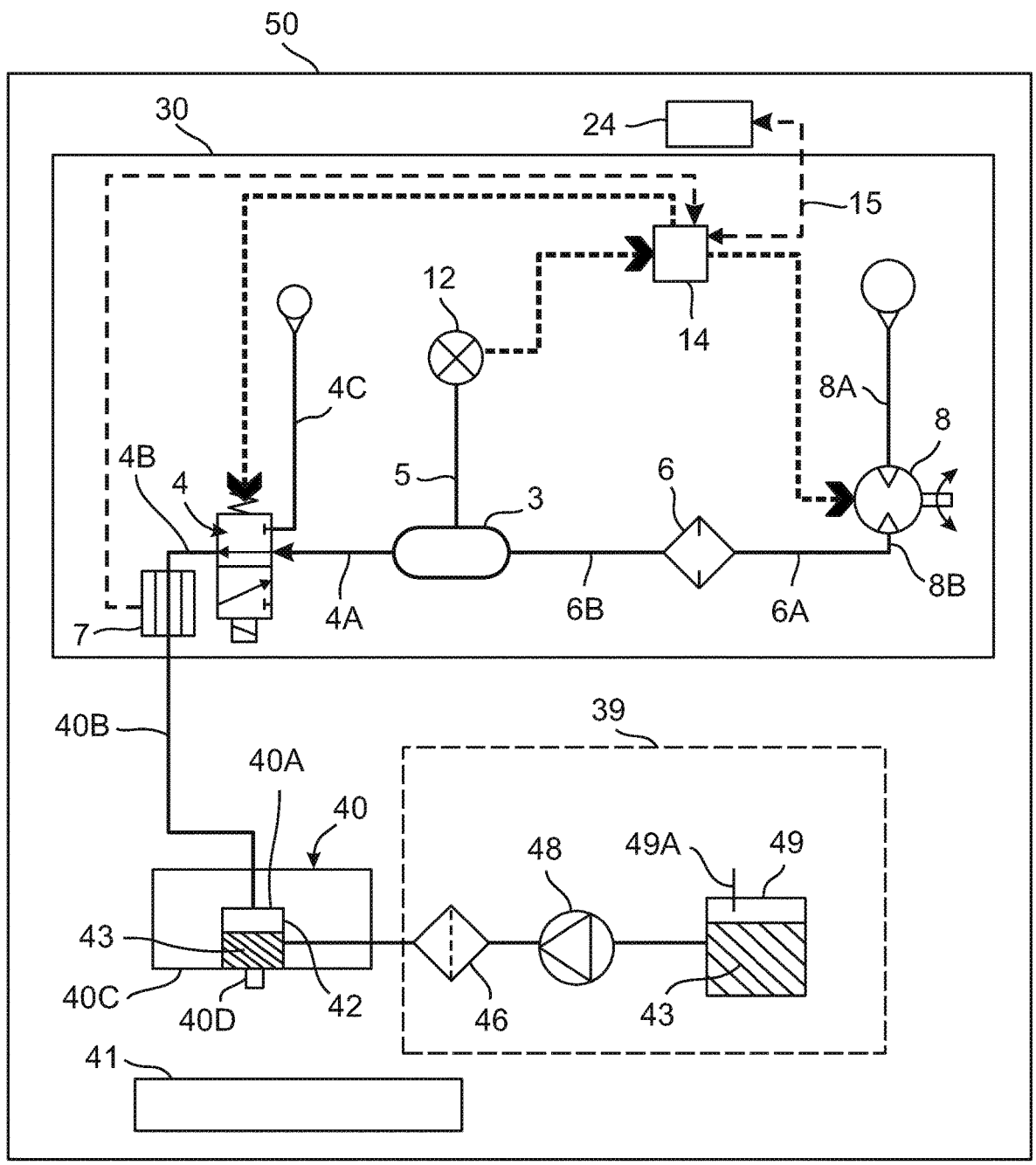
FIG. 3 is a schematic diagram illustrating part of an inkjet printer including a pressure controlling system fluidically connected to an inkjet print head of the inkjet printer, in accordance with some embodiments of the inkjet printers of the present application.

Reference is now made to FIG. 3, which is a schematic diagram illustrating part of an inkjet printer including a pressure controlling system fluidically connected to an inkjet print head of the inkjet printer, in accordance with some embodiments of the inkjet printers of the present application.

The inkjet printer 50 includes a pressure controlling system 30, an inkjet print head 40 fluidically connected to the pressure controlling system 30 by a flexible hollow conduit 40B, an (optional) ink overflow detector 7, an external ink supply system 39 fluidically connected to the print head 40 for supplying ink thereto and an (optional) printing tray 41. If the printer 50 is implemented as a 3D AM printer, the tray 41 may be used to build the printed object thereupon.

The ink jet printer 50 also includes a processor/controller 24 and all the necessary control electronics (not shown) and moving mechanisms (not shown) for controlling the movements of the print head 40. It is noted that the control electronics of the printer 50 and the moving mechanisms of the print head 40 are not shown in detail in FIG. 3 for the sake of clarity of illustration. Such control electronics and print head moving mechanisms (which may be 2D moving mechanisms or 3D moving mechanisms) are well known in the art, are not the subject matter of the present application and are therefore not described in detail hereinafter.

The processor/controller 24 of the printer 50 may be connected to the print head 40 for operating the print head 40D and may also be connected to any print head moving mechanisms (not shown) to control the operation thereof (the communication lines connected between the processor controller 24 and the print head 40 and the communication line connected between the processor/controller 24 and any moving mechanisms for moving the print head 40, are not shown in FIG. 3 for the sake of clarity of illustration). The processor/controller 24 of the printer 50 is also connected to the processor/controller 14 of the pressure controlling system by a communication line 15 for providing command signals to the processor controller 14.

Typically, such command signals may include a "purge signal" instructing the pressure control system 30 to perform a purge sequence of steps required for purging the print head 40 and a "vacuum signal" instructing the pressure control system to perform a sequence of steps required for returning the pressure within the print head 40 to the negative pressure required for preventing weeping. The communication line 15 may (optionally) be a bidirectional communication line for providing signals (such as status signals) and/or data to the processor/controller 24 operating the printer. Such data may include, among others, pressure level data obtained from the pressure sensor unit 12, signals or data from an ink backflow detector 7 and/or other data.

The print head 40 may include a print block 40C including an internal ink reservoir 40A fluidically connected to an external ink supply system 39. The internal ink reservoir 40A fluidically communicates with an ink ejecting mechanism 40D. The ink ejecting mechanism 40D may be, but not limited to, a thermal ink-drop ejecting mechanism, a piezoelectric ink drop ejecting mechanisms or any other type of drop on demand (DOD) ink ejecting mechanism known in the art. The internal ink reservoir 40A is fluidically connected to the external ink supply system 39 which supplies ink 43 to keep the level of ink 43 in the internal ink reservoir 40A at a substantially fixed level. The external ink supply 39 may include a external ink reservoir 49 which may include an air vent 49A, a pump 48 and a filter 46. The external ink reservoir 49 is fluidically connected to the pump 48 to supply the ink 43 to the pump 48. The pump 48 may be fluidically connected to a filter 46 and may pump ink 43 through the filter 46 for filtering the ink 43 to remove any particulate matter which may clog any fluidic passages within the print head 40 or any small passages and/or orifices in the ink ejecting mechanism 40D. The filter 46 may be suitably fluidically connected to the internal ink reservoir 40A to supply ink 43 thereto.

The pressure controlling system 30 is similar in construction and operation to the pressure controlling system 20 of FIG. 2, except that it may also include an (optional) ink backflow detector 7. In accordance with some embodiments of the pressure controlling systems of the present application, the backflow detector 7 may be used to detect backflow of ink 43 through the hollow conduit 40B connecting the internal ink reservoir 40A to the third port 4B of the two way/three port valve 4. Such a backflow detector is advantageous in cases in which the ink supply system malfunctions (or received faulty control signals from any electrical circuitry and/or processor/controller controlling the operation of the pump 48) causing excess ink 43 to backflow through the internal ink reservoir 40A into the hollow conduit 40B and from the hollow conduit 40B into the valve 4. Such backflow may block the passages within the valve 4 and may cause malfunction of the valve 4.

In some embodiments of the pressure control systems of the present application, the hollow conduit 40B may be a flexible optically transparent hollow tubing and the backflow detector may be an active optical sensor including a light source (not shown) illuminating a part of the hollow conduit 40B with visible light or with any other electromagnetic radiation having a wavelength or wavelength range to which the material of the hollow conduit 40B is transparent (for example, Infrared radiation) and a light sensor (not shown) for sensing changes in the absorption of light caused by the ink 43 flowing through the part of the hollow conduit 40B which is monitored by the backflow detector 7.

The backflow detector 7 may be suitably connected to the processor controller 14 for providing signals representative of the absorption of light by the monitored part of the hollow conduit 40B. If the ink 43 reaches the monitored part of the hollow conduit 40B, the change in light absorption due to the presence of ink 43 in the optical path of the backflow detector 7 is sensed and output to the processor/controller 14. The processor/controller 14 is programmed to detect the presence of ink 43 in the monitored part of the hollow conduit 40B by processing the signals output by the optical sensor of the backflow detector and to respond to the detection of ink backflow by sending a command to the pump 8 to operate at maximal speed to increase the pressure within the pressure chamber 3 to purging pressure level in order to push any ink in the hollow conduit 40B back towards the internal ink reservoir 40A to avoid the ink 43 from reaching the valve 4.

It is noted that the backflow detector 7 need not obligatorily be implemented as an optical sensor, and other types of sensors may be used to implement the backflow detector 7. For example, in accordance with some embodiments of the pressure controlling systems of the present application, the backflow detector may be a capacitance sensor, an ultrasonic sensor, an inductance sensing sensor, or any other type of sensor/detector capable of detecting ink reaching a selected part of the hollow conduit 40B, as is known in the art. It is further noted that in some embodiments of the pressure controlling systems of the present application, the processor/controller 14 may need to process signals sensed by the backflow detector to detect if ink has backflowed into the hollow conduit 40B, in some other embodiments of the pressure controlling systems of the present application, the backflow detector 7 may include additional (analog and/or digital) electrical circuitry which may further process any signals sensed by any sensor(s) included in the backflow detector 7 to autonomously detect the presence of ink backflow (without the need for any processing by the processor controller 14. In such embodiments, the backflow detector 7 may output to the processor/controller 14 a signal representing the detection of ink backflow (such as, for example, a positive going TTL voltage pulse, or, alternatively, any other type of suitable signal known in the art).

The pressure within the internal ink chamber 40A is controlled by the pressure controlling unit 30 as disclosed in detail hereinabove for the pressure controlling system 20 of FIG. 2. In embodiments including the backflow detector 7, the processor/controller 14 (or any other processor/controller included in the printer 50) may also be programmed to respond to a detection of ink backflow by operating the pump 8 to increase the pressure level within the pressure chamber 3 to purging pressure levels as disclosed in detail hereinabove.

It is noted that while the specific exemplary embodiment of the printer 50 of FIG. 3 includes a single print head, this is not obligatory, and the pressure controlling systems of the present application (such as, for example, the pressure controlling systems 10, 20 and 30 of FIGS. 1, 2 and 3, respectively) may be included in inkjet printers (of the 2D or 3D types) having multiple print heads and may be used as disclosed hereinabove to control the pressure levels within multiple print heads.

For example, the pressure controlling system 100 disclosed hereinafter with respect to FIGS. 4-6 (as well as any of the other pressure controlling systems disclosed in the present application) may be used to control the pressure levels in any type of printers having multiple print heads (such as, for example the multi-print head assembly including eight different print heads of FIG. 8 hereinafter). Thus, the pressure controlling systems disclosed in the present application may be used for simultaneously controlling the pressure of inkjet print head assemblies including any practical number of print heads, such as print head assemblies including 1-32 print heads or any number of print heads greater than 32 print heads.

It is also noted that the ink backflow detector (or ink backflow sensor) disclosed with respect to the pressure controlling system 30 of FIG. 3 is not obligatory to implementing the pressure controlling systems of the present application and that some embodiments of the pressure controlling systems (such as the exemplary systems 10 and 20, disclosed hereinabove and illustrated in FIGS. 1 and 2, respectively) may be constructed and operated without an ink backflow detector/sensor.

Figure 4:
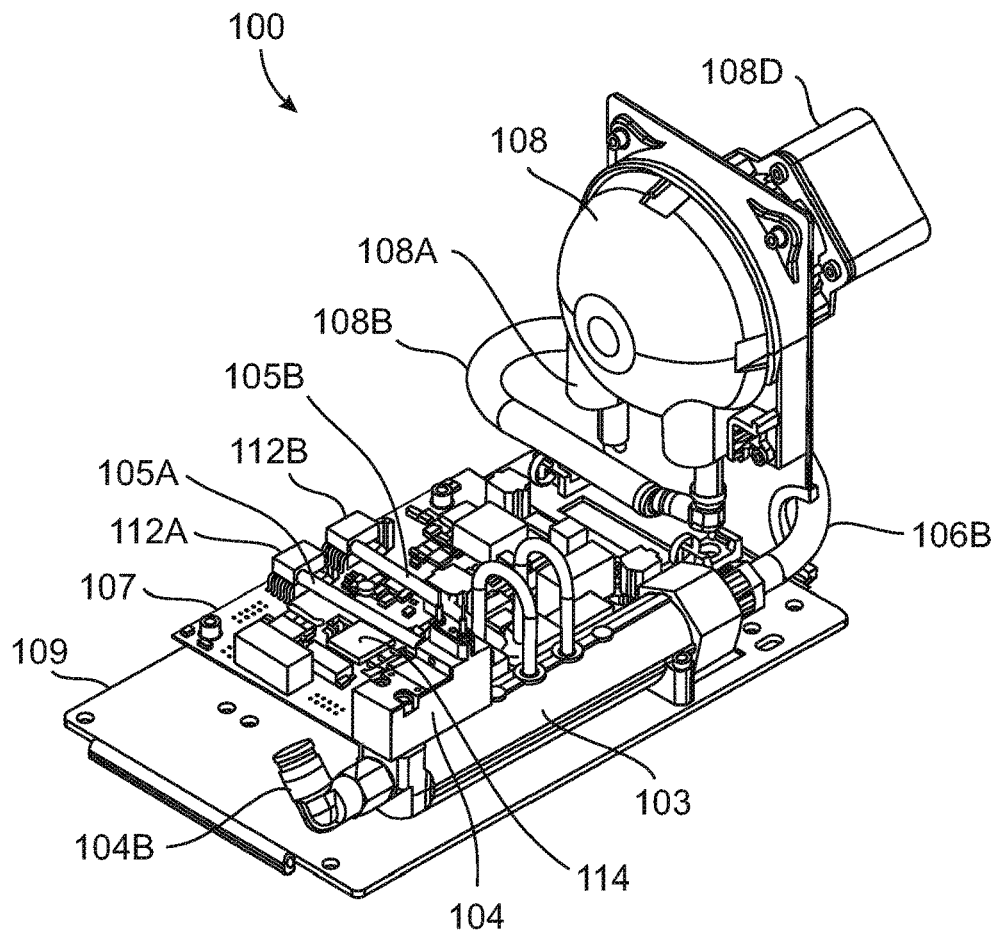
FIG. 4 is a schematic isometric view illustrating a pressure controlling system in accordance with an exemplary embodiment of the pressure controlling systems of the present application.
Figure 5:
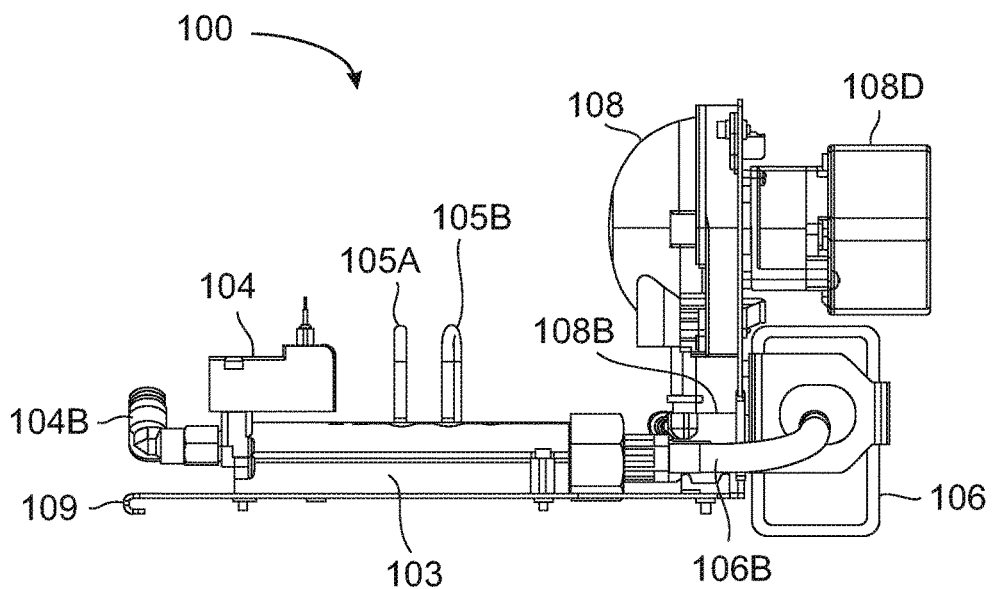
FIG. 5 is a schematic side view of the pressure controlling system of FIG. 4.
Figure 6:
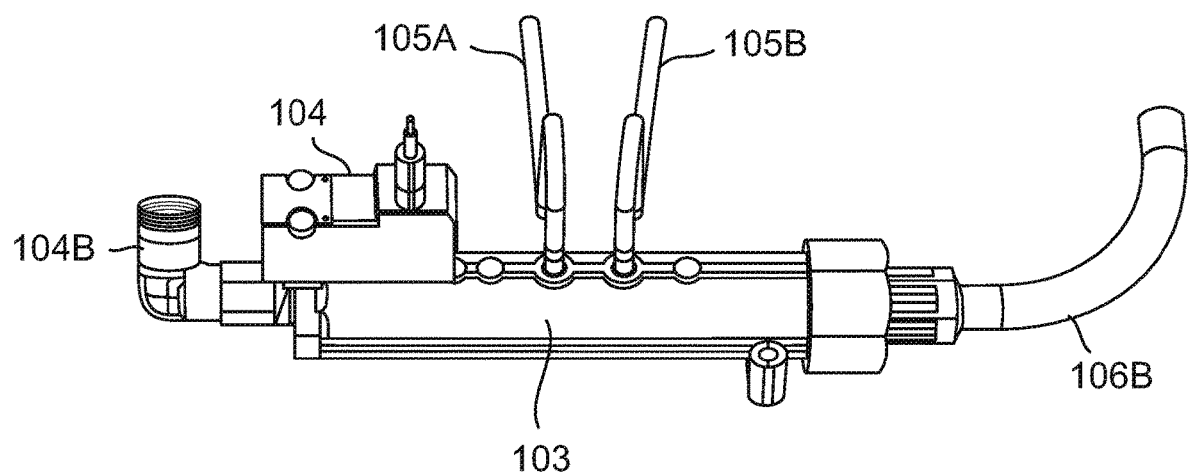
FIG. 6 is a schematic isometric view of part of the pressure controlling system of FIG. 4.

Reference is now made to FIGS. 4-6. FIG. 4 is a schematic isometric view illustrating a pressure controlling system in accordance with an exemplary embodiment of the pressure controlling systems of the present application. FIG. 5 is a schematic side view of the pressure controlling system of FIG. 4. FIG. 6 is a schematic isometric view of part of the pressure controlling system of FIG. 4.

The pressure controlling system 100 includes a pressure chamber 103, a three port/two way valve 104, a filter 106 (not seen in the particular isometric view of FIG. 4 but shown in FIG. 5), a bidirectional (reversible) pump 108, two pressure sensors 112A and 112B and a processor/controller 14. The pressure sensors 112A and 112B and the processor controller 114 are disposed on a printed circuit board 107 that is attached to a mounting panel 109. The pressure sensors 112A and 112B are fluidically coupled to the pressure chamber 103 by two suitable conduits 105A and 105B, respectively, for sensing the pressure within the pressure chamber 103. The pressure chamber 103 is fluidically connected to the pump 108 through a filter 106 (best seen in FIG. 6) which is interposed between the pressure chamber 103 and the pump 108. The filter 106 is fluidically connected to the second pump port 108B by a hollow conduit 106A.

The filter 106 is fluidically connected to the pressure chamber 103 by a hollow conduit 106B. The pump 108 has a first pump port 108A which opens to the atmospheric air outside the pressure controlling system 100 and a second pump port 108B which is connected to the filter 106 and fluidically communicates with the pressure chamber 103 through the filter 106. The filter 106 is a filter adapted for filtering the external atmospheric air which enters the pump 108 through the first pump port 108A.

The pressure chamber 103 is also connected to the valve 104. The valve 104 has three ports. A first port (not shown) of the valve 104 is controllably fluidically connectable to the pressure chamber 103. A second port (not shown in the isometric view of FIG. 5) of the valve 104 is controllably fluidically connected to an output fitting 104B which is connectable to an inkjet print head (the print head is not shown in FIGS. 4-6 but see FIGS. 3, 7 and 8 illustrating print head(s) coupled to the pressure controlling system). A third port of the valve 104 (not shown, as it is disposed at the bottom part of the valve 104) is controllably fluidically connectable with atmospheric air. The three port/two way valve 104 is a model 15C1C2A4HNOAM normally open solenoid valve, commercially available from AMISCO, Italy. The operational states (open state and closed state) of the valve 104 are as disclosed in detail hereinabove for the valve 4 of FIG. 1.

The pump 108 is a model WP11-N1/4(200)BA2G-BS material peristaltic pump with a ¼" internal diameter and a BA type stepper motor, commercially available from Welco Co., Ltd., Japan. The pump 108 is powered by a reversible stepper motor 108D. The pump 108 is a reversible pump and allows to pump air out of the pressure chamber 103 by rotating the stepper motor 108D in a first direction or to pump air into the pressure chamber 103 by rotating the stepper motor 108D in a second direction opposite to the first direction. The rotation speed of the stepper motor 108D is also controllable by the processor controller 114 and determines the rate of air flow of the pump 108.

When the valve 104 is in the open state, the pump 108 may be operated in two different operational modes. In a first operational mode (vacuum mode), the pump is operated to withdraw air from the pressure chamber 103 such that the air in the pressure chamber 103 is pumped out of the pressure chamber 103 through the filter 106 and the port 108B into the pump 108 and out of the port 108A out into the atmosphere.

This mode of operation of the pump 108 reduces the pressure within the pressure chamber 103 resulting in a partial vacuum within the pressure chamber 103. In a second operational mode (purging mode), the pump 108 is operated to pump atmospheric air from the atmosphere through the port 108A into the second pump port 108B and through the filter 106 into the pressure chamber 103. This mode of operation of the pump 108 increases the pressure within the pressure chamber 103.

In the exemplary embodiment of the pressure controller system 100, the processor/controller 114 that controls the operation of the system 100 is implemented as a dedicated processor/controller which is physically disposed on and electrically wired to the associated electronic circuitry on a PCB 107 that is attached to a panel 109 of the system 100. The processor/controller 14 is suitably electrically coupled to the pressure sensors 112A and 112B which are also disposed on the PCB 107. The pressure sensor 112A is a model MPXV5100DP pressure sensor and the pressure sensor 112B is a model MPXV4006DP low pressure sensor both sensors are commercially available from Freescale Semiconductor Inc., USA. The pressure sensor 112 A is a high pressure sensor with a nominal working pressure range of 0-14.6 ATM. The pressure sensor 112B is a low pressure sensor with a nominal working pressure range of 0-0.87 ATM. The use of the two sensors 112A and 112B allows the performing of pressure measurements over an extended pressure range with a better dynamic range and sensitivity than the dynamic range and sensitivity that are obtainable by using a single pressure sensor for the entire working pressure range of the system 100. The use of a combination of the pressure sensors 112A and 112B allows excellent dynamic range and sensitivity in a cost effective manner.

The processor controller 114 receives from the pressure sensors 112A and 112B signals representing the pressure within the pressure chamber 103. The processor/controller 114 is also electrically connected to the pump 108 and may send pump control signals to the pump 108 for controlling the operation thereof. The pump control signals may control the direction of pumping (either pumping air into the pressure chamber 103 to increase the pressure within the pressure chamber 103 or pumping air out of the pressure chamber 103 to reduce the pressure therein) and/or the rate of pumping of the pump 108.

The processor/controller 114 is also suitably electrically connected to the valve 104 for controlling the operation thereof and for controllably switching the valve 104 between the open and closed states as disclosed in detail hereinabove with respect to the processor/controller 14 and the valve 4 of FIG. 1.

Reference is now made to FIG. 6 which is a schematic side view of part of the pressure controlling system of FIG. 4.

The part of the pressure controlling system 100 illustrated in FIG. 6 includes the two way/three port valve 104 fluidically connected to the pressure chamber 103, the hollow conduit 106B (used to fluidically connect the pressure chamber 103 to the filter 106 of FIG. 4), the conduits 105A and 105B attached to the pressure chamber (and used to fluidically connect the pressure chamber 103 to the pressure sensors 112A and 112B, respectively, of FIG. 4), and the port 104B, usable for connecting the valve 104 to a print head (not shown in FIG. 6).

It is noted that some embodiments of the pressure controlling system 100 of FIGS. 4-5, may also include an ink backflow sensor/detector (such as the ink backflow detector 7 of FIG. 3). In accordance with one such exemplary embodiment, the backflow detector is implemented as a tube liquid sensor having a catalogue No. OCB350L178Z commercially available from OPTEK TECHNOLOGY Inc. a TT ELECTRONICS COMPANY, TX, U.S.A. The sensor/detector (not shown in FIG. 4 for the sake of clarity of illustration) may be attached to the mounting panel 109 (of FIG. 4) and a transparent flexible hollow tube (not shown in FIG. 4 for the sake of clarity of illustration) may be sealingly attached at one end thereof to the port 104B and at the other end thereof to a print head assembly (not shown in FIG. 4, but see FIG. 8 hereinafter for an exemplary embodiment of such a print head assembly) to fluidically connect the port 104B to the internal ink reservoir(s) of the print heads in the print head assembly.

Part of the transparent tubing connecting the print head(s) with the port 104B may pass within the detector/sensor. The detector/sensor may optically detect/sense any ink reaching the part of hollow tube passing through the detector/sensor and sends signals (detection) to the processor/controller 114, which, upon detection of ink backflow, may operate the pump 108 at maximal speed to increase the pressure within the pressure chamber 103 to the purging pressure level in order to prevent penetration of ink into the valve 104 and/or into any other components of the pressure controlling system 100, to avoid malfunctioning of the of the pressure controlling system 100.

Figure 7:
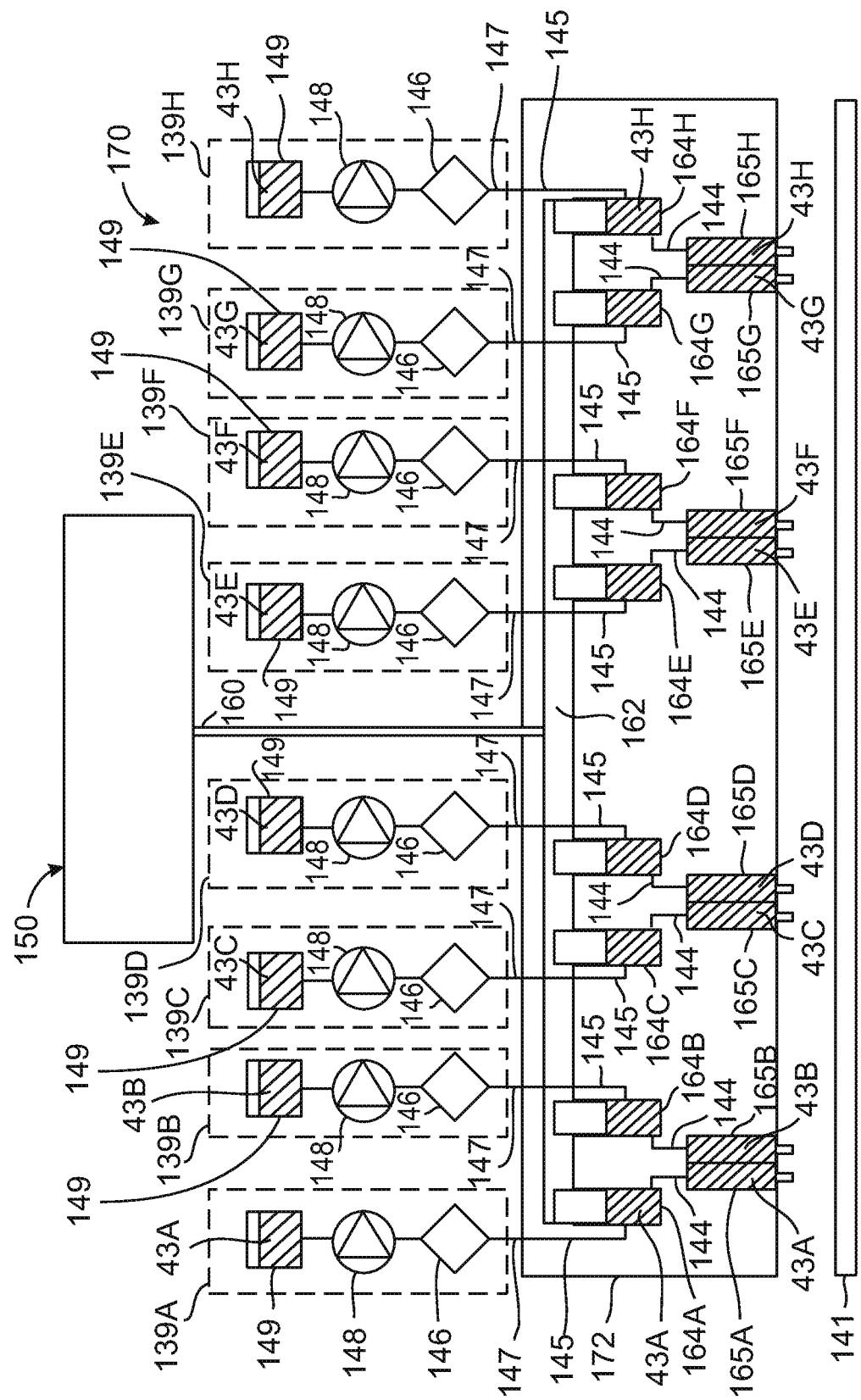
FIG. 7 is a schematic, part cross sectional part fluidics block diagram illustrating a multiple print head printing block of a 3D inkjet printer connected to a pressure controlling system, in accordance with an embodiment of the inkjet printers of the present application.

Reference is now made to FIG. 7 which is a schematic, part cross sectional part fluidics, block diagram illustrating a multiple print head assembly of a 3D inkjet printer connected to a pressure controlling system, in accordance with an embodiment of the inkjet printers of the present application.

It is noted that FIG. 7 illustrates only the components relevant to understanding the structure and operation of the print head assembly 170 and the pressure controlling system 150 of an inkjet printer. As such any of the other components of the printer in which the illustrated components may be included, such as, for example, the printer's housing or gantry, the electromechanical systems for moving the print block 172 (two dimensionally or three dimensionally) or any other mechanical, and/or electro-mechanical and/or electrical and/or electronic components for supplying power and for controlling the operation of such a printer are not shown for the sake of clarity of illustration. The construction and operation of any of the components that are not shown in FIG. 7 are well known in the art and are therefore not discussed in detail hereinafter.

The print head assembly 170 includes a print block 172 and eight ink supply systems 139A-139H. The print block 172 includes eight print heads 165A-165H and eight respective internal ink reservoirs 164A-164H. Each of the print heads 165A-165H is fluidically connected to an internal ink reservoir of the respective internal ink reservoirs 164A-164H by a hollow passage 144 of eight hollow passages 144 formed within the print block 172. Each of the hollow passages 144 supplies ink from an internal ink reservoir to the print head associated with the internal ink reservoir. For example, the internal ink reservoir 164A supplies ink 43A to the print head 165A through a hollow passage 144, the internal ink reservoir 164B supplies ink 43B to the print head 165B through a hollow passage 144.

The print block 172 also includes eight hollow passages 145 formed therein. Each of the eight hollow passages 145 is fluidically connected at a first end thereof to a single internal ink reservoir of the eight internal ink reservoirs 164A-164H (as illustrated in detail in FIG. 7). Each of the eight hollow passages 145 is fluidically and sealingly connected at a second end thereof to one of the ink supply systems 139A-139H by a flexible hollow conduit 147. The eight hollow conduits 147 may be any suitable flexible hollow tube made from any material suitable for containing inkjet ink.

Each of the eight ink supply systems 139A-139H includes an external ink reservoir 149 that is fluidically connected to a pump 148 and an ink filter 146 that is fluidically connected to the pump 148 at its input end and to one of the hollow conduits 147 at its output end. The external ink reservoirs 149 may be vented reservoirs similar to the external ink reservoir 49 (of FIG. 3). Preferably, but not obligatorily, the external ink reservoirs may be replaceable cartridge type reservoirs as is known in the art.

In operation, in any one of the ink supply systems 139A-139H, the pump 148 may pump ink from the external ink reservoir 149 of the ink supply system into the ink filter 146, to replenish the ink that is used during printing from the internal ink reservoir to which the specific ink supply system is fluidically connected.

In some embodiments of the print head assembly 170, each of the print heads 165A-165H is filled with a different type of ink 43A-43H, respectively. The different inks may 43A-43H may be differently colored inks or may be any inks having different material compositions having different physical and/or chemical properties, as is well known in the art and any suitable ink combinations may be used for printing.

The printing block 172 includes a hollow manifold 162 formed therein. The hollow manifold 162 is in fluidic communication with each of the internal ink reservoirs 164A-164H, such that the air pressure within the hollow manifold 162 and within the air space of each of the eight internal ink reservoirs 164A-164H may equalize. The print assembly 172 also includes a pressure controlling system 150. The pressure controlling system 150 may be fluidically connected to the print block 172 by a suitable hollow conduit 160. The hollow conduit 160 may be any suitable flexible tubing capable of withstanding the range of negative and positive pressures produced by the pressure controlling system 150. The hollow conduit 160 is sealingly fluidically connected at a first end thereof to the hollow manifold 162 of the print block 172 and is connected at a second end thereof to the two way/three port valve (valve not shown in FIG. 7) of the pressure controlling system 150.

The pressure controlling system 150 may be implemented as any of the pressure controlling systems disclosed in the present application. For example, if the pressure controlling system 150 is implemented as any of the pressure controlling systems 10 or 20 or 30 (of FIGS. 1, 2 and 3, respectively), the second end of the hollow conduit 160 may be sealingly fluidically connected to the second port 4B of the two way/three port valve 4.

If the pressure controlling system 150 is implemented as the pressure controlling systems 100 (of FIGS. 4-5), the second end of the hollow conduit 160 may be sealingly fluidically connected to the second port 104B of the two way/three port valve 104. Similarly, if the pressure controlling system 150 is implemented as the pressure controlling systems 120 (of FIG. 8 hereinafter), the second end of the hollow conduit 160 is sealingly fluidically connected to the second port 4B of the two way/three port valve 4.

Returning to FIG. 7, in operation, the print head assembly 170 may be used to print either a 2D print, in the case of a 2D inkjet printer or a 3D object in the case of a 3D AM inkjet printer. One of the advantages of the pressure controlling system 150 of FIG. 7 is that it allows to simultaneously control the pressure within the internal spaces above the inks included in all the eight internal ink reservoirs 164A-164H through the hollow manifold 162, obviating the need for several separate pressure controlling systems separately and individually controlling the pressure within each of the internal ink reservoirs 164A-164H.

Another advantage of the pressure control systems disclosed in the present application is that they allow the use of a single relatively inexpensive low capacity reversible pump in combination with a pressure chamber and a two way three port valve to efficiently and rapidly reach the desired negative pressure levels required to avoid weeping at the orifices of the print head(s) as well as to efficiently and rapidly reach the positive pressure level required for purging of the print head(s).

The use of an inexpensive low capacity pump (coupled to the pressure chamber connected to the three port two way valve) reduces the overall cost of the system as well as the overall cost of maintenance of the printer system, reduces unnecessary waste of ink due to reducing the amount of ink wasted during the purging cycle (as the duration of the purging cycle may be significantly reduced when using the pressure control systems disclosed herein), while providing the rapid pressure changes required by the printer between purging, wiping and printing actions, resulting in an overall reduction of purging time and of the time required to return to the vacuum level (negative pressure) required for printing, which advantageously results in faster printing rates.

This advantageous ability to rapidly reach negative and/or positive pressure levels results from the operation of the two way three port valve as disclosed in detail hereinabove.

For example, after purging is completed, the pressure level within the pressure chamber of any of the pressure controlling systems disclosed herein is relatively high and it would have required quite a long time for the low capacity pump of the pressure controlling system to evacuate all the air within the pressure chamber to reach the required operating negative pressure. However, the closing of the (normally open) valve of the pressure controlling systems of the present application prior to operating the pump to reduce pressure within the pressure chamber, allows the high purging pressure within the internal volume of the print head(s) to rapidly dissipate by equalizing with external atmospheric pressure through the third port of the two way/three port valve (such as, for example, the third port 4C of FIGS. 1-2, or the third port of the valve 104 of FIG. 4).

Similarly, when purging needs to be performed while the pressure within the print head(s) and within the pressure chamber is negative, the closing of the two way/three port valve allows rapid equalization of the pressure within the internal volume of the print head(s) with atmospheric pressure through the third port of the two way/three port valve (such as, for example, the third port 4C of FIGS. 1-2, or the third port of the valve 104 of FIG. 4) while the pump is being operated at maximal speed to increase the pressure within the pressure chamber only to the required purging pressure. This rapid pressure equalization allows a shorter pumping time to reach purging pressure.

Thus, the construction and method of operation of the pressure controlling systems disclosed herein effectively reduce the time required for performing pressure transitions within printing head(s) fluidically connected to the pressure controlling system(s) between negative operating pressure and purging pressure and between purging pressure to negative operating pressure. These faster pressure transitions may reduce the print head's idle time and improve the overall printing speed.

The inclusion of the ink backflow detectors and/or ink backflow sensors (such as, for example, the ink backflow detector 7 of FIG. 3) in some embodiments of the pressure controlling systems of the present application may advantageously allow reducing or preventing entry of ink into the components of the pressure controlling systems of the present application that include such ink backflow detectors/sensors resulting in reducing printer down time, increasing the reliability of the printer, reducing printer maintenance and reducing the cost of operation of the printer due to reduced need for replacement of pressure controlling systems damaged by ink backflow.

It is noted that while preferably, the pressure controlling systems may include an internal processor/controller for processing signals (such as, but not limited to, pressure related signals) and for controlling the operation of the two way/three port valve and the pump included in the pressure controlling system, this is not obligatory, and in accordance with some embodiments of the pressure controlling systems of the present application, the pressure controlling system may be operated by a processor/controller of a printer in which the pressure controlling system is disposed. Such a processor/controller of the printer may be programmed to control all the functions of the printer (such as, but not limited to, print head movement control, printing head printing control, printer diagnostics, printer interface, and any other printer functions) as well as to control the operation of the pressure controlling unit installed in the printer.

Figure 8:
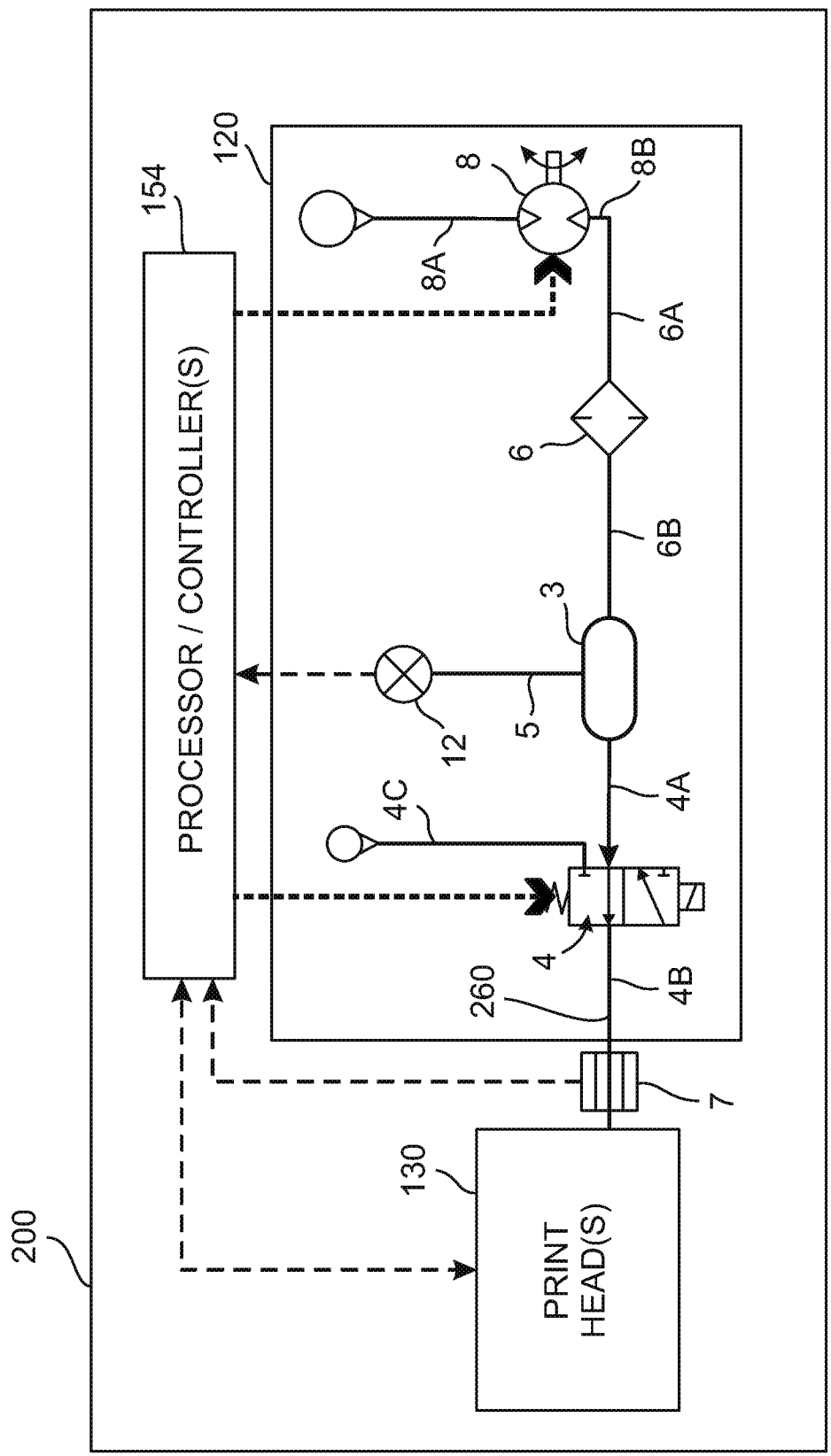
FIG. 8 is a schematic part fluidic/part block diagram illustrating an inkjet printer using a pressure control system in accordance with yet another embodiment of the pressure control system and of the inkjet printers of the present application.

Reference is now made to FIG. 8 which is a schematic part fluidic part block diagram illustrating an inkjet printer using a pressure control system in accordance with yet another embodiment of the pressure control system and of the inkjet printers of the present application.

It is noted that FIG. 8 illustrates only the components relevant to understanding the structure and operation of the print head(s) 130 and the pressure controlling system 120 of an inkjet printer 200. As such, any of the other components of the printer 200 in which the illustrated components may be included, such as, for example, the printer's housing or gantry, the electromechanical systems for moving the print head(s) 130 (two dimensionally or three dimensionally) or any other mechanical, and/or electro-mechanical and/or electrical and/or electronic components for supplying power and for controlling the operation of the printer 200 are not shown in FIG. 8, for the sake of clarity of illustration. The construction and operation of any of the components that are not shown in FIG. 8 are well known in the art and are therefore not discussed in detail hereinafter.

The inkjet printer 200 may be a 2D printer or a 3D printer. The printer 200 may include one or more processors/controllers 154, a pressure controlling system 120 and one or more print heads 130. The pressure controlling system 120 is similar in construction and operation to the pressure controlling system 20 of FIG. 2, except that the pressure controlling system 120 does not include the internal processor/controller 14 of the system 20. The pump 8, the pressure chamber 3, the pressure sensor unit 12 and the valve 4 of the pressure controlling system 120 may be configured and may operate in a similar manner to the operation of the pressure controlling 20, except that the processor/controller(s) 154 may be suitably connected to the pump 8 to control the operation of the pump 8. The processor/controller(s) 154 may also be connected to the pressure sensor unit 12 to receive therefrom pressure related signals and to process the received pressure related signals as disclosed in detail hereinabove with respect to the processor controller 14 of the pressure controlling system 20 of FIG. 2. The processor/controller(s) 154 may also be suitably connected to the valve 4 for operating (opening and/or closing) the valve 4.

The processor/controller(s) 154 may be also bidirectionally connected to the print head(s) 130 for sending printing commands to the print head(s) 130 and (optionally) for receiving status signals or any other signal output by the print head(s) 130. The processor/controller(s) 154 may also be connected to an (optional) ink backflow detector 7, similar in construction and operation to the ink backflow detector 7 of FIG. 3). It is, however, noted that the ink backflow detector 7 of the printer 200 may or may not be part of the pressure controlling system 120 (in the specific embodiment illustrated in FIG. 8 the ink backflow detector 7 is not part of the pressure controlling system and is disposed elsewhere within the printer 200).

A hollow conduit 260 sealingly fluidically connects the print head(s) 130 with the second port 4B of the valve 4. Part of the hollow conduit 260 is dispose adjacent to or within the ink backflow detector 7 for sensing and/or detecting ink reaching the part of the hollow conduit associated with the ink backflow detector 7, as disclosed in detail hereinabove. However, any signals output by the ink backflow detector 7 of the printer 200 that indicate that ink backflow has occurred are sent to the processor/controller(s) 154 which may be suitably connected with the ink backflow detector 7 to receive signals there from.

In accordance with some embodiments of the printer 200 the signals sent by the ink backflow detector 7 may need to be further processed by the processor/controller(s) 154 to determine if ink backflow has occurred. In accordance with other embodiments of the printer 200, the ink backflow detector 7 may have additional detection circuitry (not shown in detail in FIG. 8) included therein which processes any signals sensed and may output a signal representing the occurrence of ink backflow to the processor/controller(s) 154. If ink backflow has been detected, the processor/controller(s) 154 may operate the pump 8 to rapidly increase the pressure within the pressure chamber 3 (while the valve 4 is open) to purge ink from the hollow conduit 260 and prevent penetration of ink into any of the components of the pressure controlling system 120, as disclosed hereinabove in detail with respect to the pressure controlling system 30 of FIG. 3.

It is noted that the processor/controller(s) 154 may perform the controlling of the operation of the pressure controlling system 120 and may also perform other functions of the printer 200, such as, for example, controlling the (2D or 3D) movement of the printing head(s) 130 by any moving mechanism (not shown) included in the printer 200, outputting print head commands for ink ejection, performing diagnostic operations for the printer 200, and may also function to provide a user or operator of the printer with various status data/signals and/or warnings (such as, for example, controlling a display showing status data or the turning on/off of indicator LEDs, and the like), and may also be used to receive any commands issued by an operator through a human interface (not shown) that may be included in the printer 200.

The processor/controller 154 may also perform any other function required for the operation of any part of the printer 200. The processor/controller(s) 154 may also communicate with an external data source (such as, but not limited to a personal computer, a laptop computer, a remote or a local server, or any other suitable computing and/or data storage device) for receiving data and/or commands associated with a printing job to be performed.

It is noted that the pressure levels which need to be reached in the pressure chamber of the pressure controlling systems of the present application (such as, for example, the pressure chambers 2, 3 and 103) may vary in different printers depending, inter alia, on the volume of the pressure chamber, the internal volume of the air spaces within the print head(s) that are fluidically connected to the pressure controlling system which may include the volume of any manifold shared by several print heads if there is more than one print head in the printer, and the volume of any hollow conduit connecting the print head or manifold to the second port (such as, for example the second port 4B or 104B) of the two way/three port valve (such as, for example, the valve 4 or the valve 104).

Therefore, for each different printer including one of the pressure controlling systems disclosed herein, the specific pressure levels that need to be reached within the pressure chamber before the two way/three port valve is opened to perform purging or to achieve the required negative pressure level required to avoid weeping needs to be calculated and/or calibrated in order to program or store these two required pressure levels into the memory associated with the processor/controller of the pressure controlling system (such as, for example, the processor/controller 14 or 114), or, in cases in which the pressure controlling system does not include a dedicated processor/controller thereon, into the memory associated with the processor/controller operating the printer (such as, for example, the processor/controller 154 of the printer 200 of FIG. 8).

Calculation of the Pressure Levels Required for Specific Printers.

The ideal gas law is the equation of state of a hypothetical ideal gas. It is a good approximation of the behavior of many gases and/or gas mixtures under many conditions, although it has several limitations. The ideal gas law is often written as equation (1)

$$PV = nRT \quad (1)$$

Wherein:
P—is the pressure of the gas.
V—is the volume of the gas.
n—is the amount of substance of gas (in moles).
R—is the ideal, or universal, gas constant, equal to the product of the Boltzmann constant and the Avogadro constant.
T—is the absolute temperature of the gas (in degrees Kelvin).

In a closed system by using equation (1) on two volumes including the same gas the following equation (2) may be derived:

$$\frac{PV}{T} = C \frac{PV}{T} = C \quad (2)$$

where C is a constant that is directly proportional to the amount of gas n (Avogadro's law). The proportionality factor is the universal gas constant R.

From equation (2) it is possible to determine the desired purge pressure needed in a specific printing system.

The system is divided into two separate air compartments. The first compartment includes all the volume inside the pressure controlling system 100 from the pump pinch (the point at which the peristaltic pump roller pinches the tubing to seal the tubing) to the first solenoid port 4A. The second compartment includes all the air volume included in the second solenoid port 4B, the tube or conduit connecting the port 4B to the print head(s) and the volume of air within the internal spaces within the print head(s) (including the volume of air within any ink reservoir(s) and all other air spaces within the print head which are fluidically connected with the ink reservoirs). The volume of the first compartment is $V_1$ and the volume of the second compartment is $V_2$.

Equation (3) will then describe the relation between the two volumes of the two compartments in a static manner (when the pump is not working) as derived from equation (2).

$$\frac{P_1 * V_1}{T_1} = \frac{P_2 * V_2}{T_2} \quad (3)$$

Once the solenoid valve 104 is open the given combined volume of the entire system is approximately $V_3 = V_1 + V_2$ (ignoring any internal volume of the solenoid valve 104). The following relation holds:

$$\frac{P_1 * V_1}{T_1} = \frac{P_2 * (V_2 - V_1)}{T_2}. \quad a$$

Where,
$V_1$—is the volume of the pressure reservoir of the printing system.
$V_2$—is constant volume in a specific printing system.

$P_1$—is the preset pressure value that needs to be reached within the pressure chamber of a printer having a pressure reservoir with the volume $V_1$ and a second compartment (including the internal volume within all the printing block(s) of the printer and the internal volume of all tubes or hollow conduits connecting the print head(s) to the solenoid valve a) having a volume of $V_2$.
$T_1$—is the air temperature in the first compartment (in degrees Kelvin).
$T_2$—is the air temperature in the second compartment (in degrees Kelvin).

Under normal working conditions, the pressure sensors 112A and 112B (of FIG. 4) may sense the pressure level in the pressure chamber 103. The sensing may be continuous or intermittent or may be continuous with discrete sampling (and preferably digitizing at a desired frequency). Based on the sensed pressure levels, the processor/controller 114 may operate the pump 108 in a suitable rotation direction and at an appropriate speed of rotation to increase or decrease the pressure to reach and/or maintain the pressure values set for various operations of the pressure controlling system (such as, for example, the set "purge pressure" and the set "vacuum pressure" disclosed herein).

When a purge sequence is performed, the two compartments are fluidically disconnected from each other by the solenoid valve (such as, for example, the valve 104 of FIG. 5) and the pump (such as, for example, the pump 108 of FIG. 5) is activated to increase the pressure in the first compartment.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

The following Examples 1 and 2 are exemplary calculations:

Example 1

In a printer having two print heads having a known volume $V_1$ of the first compartment and a known volume of the second compartment, the pressure $P_1$ that needs to be reached in the first compartment (prior to opening the valve, such as the valve 4 of FIGS. 1-3 and 8 or the valve 104 of FIG. 4) in order to achieve a given purging pressure $P_2$ may be calculated as follows:

The total volume of the second compartment (which is the approximate total air volume within the two print heads including the volume of any conduit connecting the print heads to the port 104B of the valve 104) $V_2$ is about 17,300 $mm^3$.

The total volume of the first compartment $V_1$ (which is the approximate total volume of the pressure chamber 103+the volume of the conduits connecting the pressure chamber 103 to the port 104A and the volume of the conduits connecting the port 108A of the pump 108 to the pressure chamber 103) is about 25,250 mm³

The temperature of the air in the second compartment T2 is about 70° C. (which is about 343K°).

The temperature of the air in the first compartment T1 is about 45° C. (which is about in the 318K°).

The given purging pressure to be reached is $P_2=4$ PSI Therefore, $$P_1 = \frac{V_a * T_1}{V_1 * T_2} * P_2 = \frac{(17.3 + 25.2)}{25.2} * 4 = 6.5 [PSI]$$

The above calculation indicates that in order to achieve a purging pressure $P_2$ of 4 PSI in the combined volume of the fluidically connected first and second compartments after the valve 104 is opened, the pressure that needs to be achieved within the first compartment by the pump 108 prior to opening the valve 104 is about 6.5 PSI. The above calculation gives a result which is approximate only because small variations in $V_2$ may be caused during printer's operation by changes in the level of ink within the print heads. However, the calculation provides sufficient accuracy for practically determining the pressure $P_2$ required within the first compartment prior to the opening of the valve 104.

Example 2

In a printer having using the same pressure controlling system as in EXAMPLE 1 but having a printing block including eight print heads, the volume $V_1$ of the first compartment is like in EXAMPLE 1 above since the first compartment is the same. The volume of the second compartment is the same as in EXAMPLE 1 above since the volume of the pressure chamber 103+various attached conduits has not changed (the same pressure controlling system is being used), the pressure $P_1$ that needs to be reached in the first compartment (prior to opening the valve 104) in order to achieve a given purging pressure $P_2$ may be calculated as follows:

$V_2$ is about is about 54,000 mm³ (as the gas volume of eight print heads is larger than that of two print heads of EXAMPLE 1 above.

$V_1$ is about 25,250 mm³

The temperature of the air in the second compartment T2 is about 70° C. (which is about 343K°).

The air temperature in the first compartment T1 is about 45° C. (which is about in the) 318K°.

The given purging pressure to be reached has not changed and is $P_2=4$ PSI

Using the same equation as in EXAMPLE 1, $$P_1 = \frac{V_2 * T_1}{V_1 * T_2} * P_2 = \frac{(54 + 25.2)}{25.2} * 4 = 12.6 [PSI]$$

The pressure $P_1$ that needs to be reached within the first compartment by the pump 108 prior to opening the valve 104 in order to reach the same purging pressure $P_2$ within all eight printing heads is about 12.6 PSI.

It is noted that, for simplicity of calculation, the pressure values calculated in Examples 1 and 2 hereinabove, are calculated using a simplifying assumption that the pump is not operating while a purge sequence is performed. Therefore, the real expected values may be lower since the pump will actually be operating while the purge sequence is being performed. When the pump is activated and the valve is in the open state, the pressure in the combined volume $V_3$ is a time dependent function.

It will be appreciated that as pressure controlling systems may have different pressure chamber volumes and may be combined with many different types of print heads having various internal volumes, in each specific combination of a pressure controlling system and a print head (or print heads) having a specific internal volume the behavior of pressure as a function of time during a purge sequence and/or during return to vacuum mode may be different. Thus, the value of $P_1$ may need to be uniquely set and/or calibrated for each such different combination.

Figure 9:
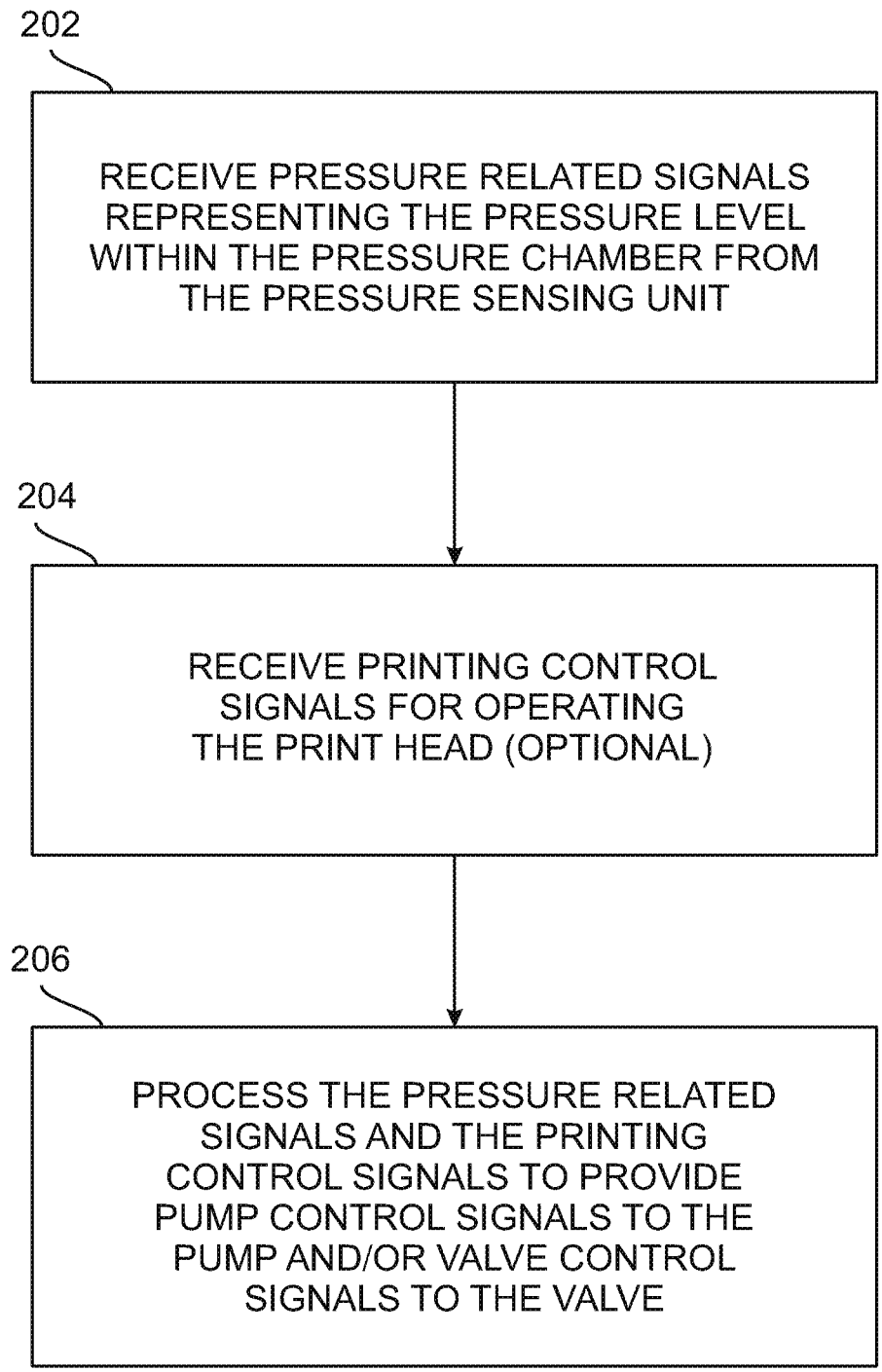
FIG. 9 is a schematic flow chart illustrating the steps of a method of operating a pressure controlling system in a printer, in accordance with some embodiments of the methods of the present application.

Reference is now made to FIG. 9 which is a schematic flow chart illustrating the steps of a method of operating the pressure controlling system of the present application in a printer, in accordance with some embodiments of the methods of the present application.

The method includes the following steps. The pressure control system (such as, for example, the pressure control system 10, 20, 50, 100, 150 and 200) receives from the pressure sensing unit (such as, for example, the pressure sensing unit 12 of FIGS. 1-3 and 8, or the pressure sensors 112A and/or 112B of FIG. 4) pressure related signals representing the pressure level within the pressure chamber (such as, for example, the pressure chamber 2 of FIG. 1, or the pressure chamber 3 of FIGS. 2-3 and 8, or the pressure chamber of FIGS. 4-6), in step 202.

The pressure control system may also receive printing control signals for operating the print head (step 204). Typically, the printing control signals may be sent from a separate processor/controller which controls the operation of the printer (such as, for example, the processor controller 24 of FIG. 3 or any printer controlling processor/controller(s) connected to the communication line 15 of FIGS. 1-3). However, in some embodiments of the pressure control system of the present application, in which a single processor/controller controls all the different functions and operations of the printer, including the operation of the pressure controlling system (such as, for example, the processor/controller 154 of the printer 200 of FIG. 8), In such a case, the receiving printer control signals of step 204 may mean that the software program(s) operating on the common printer processor/controller (such as, for example the processor controller 154) may actually generate the printing control signals and need not receive them from another processor, and the terms "receiving printing control signals" may mean that a software subroutine or program software module controlling the operation of the pressure control system receives printing control signals from the main program or from another subroutine or program software module that may control the printing functions of the printer. Thus, the term "receiving printing control signals" may in this case mean "internally" receiving or having access to such signals generated within the same single processor/controller.

The pressure control system may then process the pressure related signals and the printing control signals to provide pump control signals for controlling the speed and/or the direction of pumping of the pump (such as for example, the pump 8 of FIGS. 1, 2, 3 and 8 or the pump 108 of FIG. 4) and valve control signals for controlling the operation of the valve (such as, for example, the valve 4 of FIGS. 1, 2, 3 and 8, or the valve 104 of FIG. 4) in step 206. As disclosed in detail hereinabove, the valve has two states, an open state and a closed state. If the valve is a normally open valve, a control signal for closing the valve may be a positive voltage signal such as a positive voltage pulse applied to the valve control terminals and a control signal for opening a closed valve may be a return of the voltage signal to zero or to a positive voltage lower than the positive voltage value required for opening the valve. However, the signals may be other different signals depending on the specific type of valve being used as is well known in the art.

Similarly, if the valve is a normally closed valve, the valve control signals may be a control signal for opening the valve may be a positive voltage signal such as a positive voltage pulse applied to the valve control terminals and a control signal for closing an open valve may be a return of the voltage signal to zero or to a positive voltage lower than the positive voltage value required for opening the valve. However, the signals may be other different signals depending on the specific type of valve being used as is well known in the art.

Figure 10A:
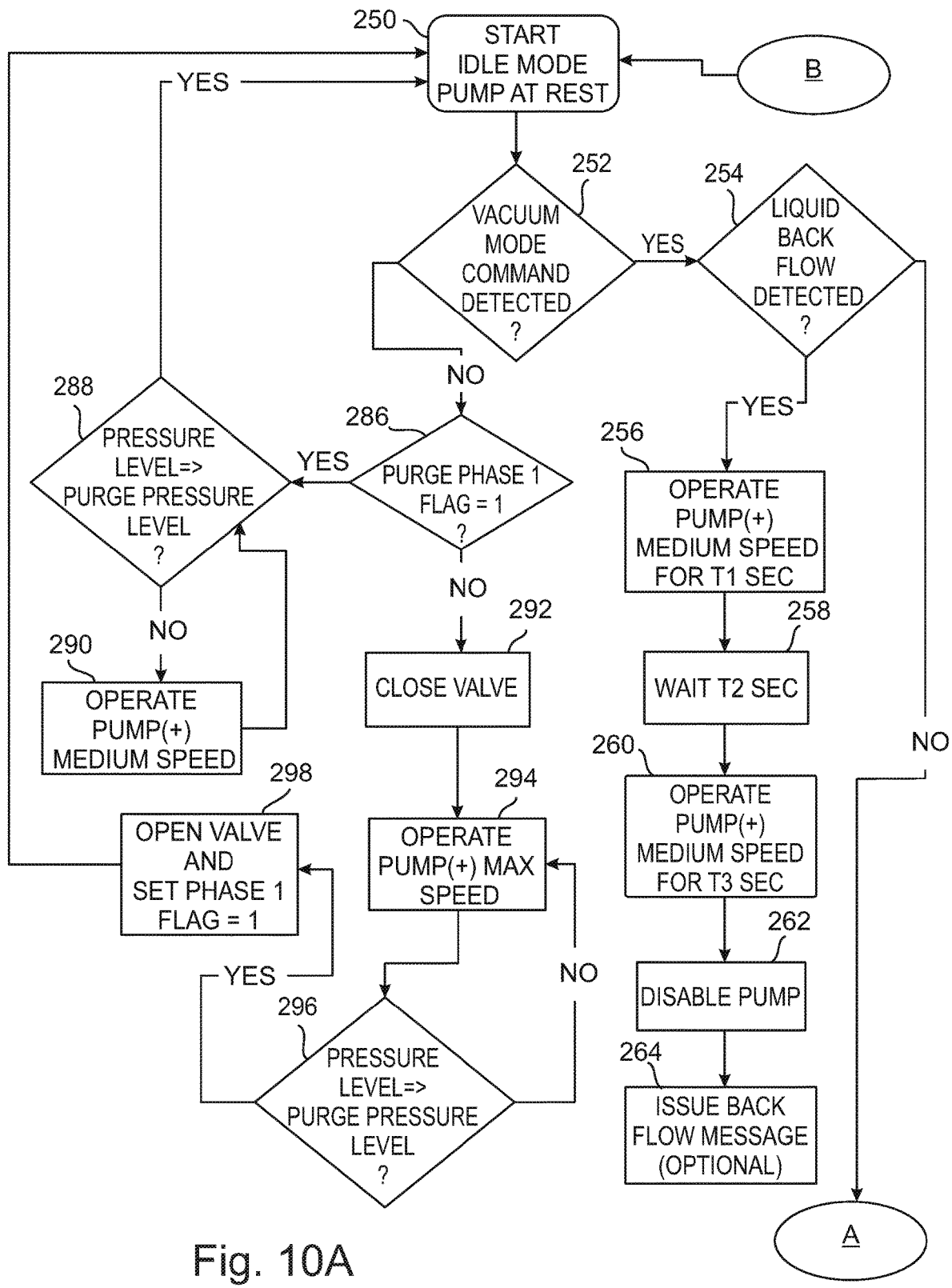
FIGS. 10A-10B are schematic flow charts illustrating the steps of a method of operating a pressure controlling system in a printer, in accordance with some embodiments of the methods of the present application.
Figure 10B:
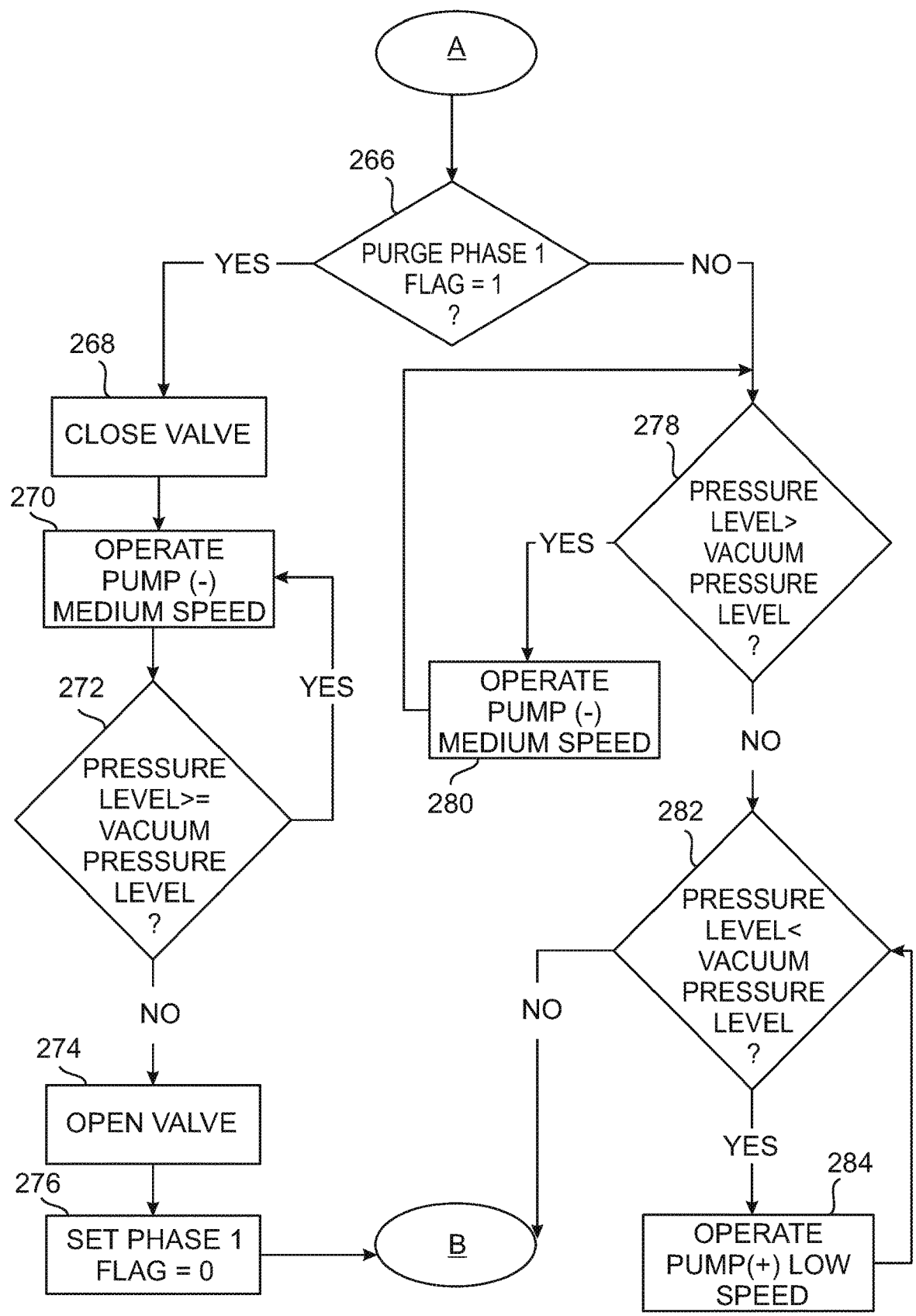

Reference is now made to FIGS. 10A-10B which are schematic flow charts illustrating the steps of a method of operating a pressure controlling system in a printer, in accordance with some embodiments of the methods of the present application.

The flow chart of FIGS. 10A-10B is a specific example of an implementation of the method for operating the pressure controlling system 100 of FIGS. 4-6 in conjunction with a specific inkjet print head (not shown).

The program operating on the pressure controlling system 100 may start from a state in which the pump 108 is idle (at rest) and the valve 104 is open (step 250). The program checks whether a vacuum mode command is detected (step 252). If a vacuum mode command is detected, the program checks if liquid (ink) backflow has been detected (such as, for example, by the ink backflow detector 7 of FIGS. 3 and 8), in step 254. If ink backflow has been detected, the program operates the pump 108 at medium speed in a positive rotation direction (as indicated by the "+" sign) to increase the pressure within the pressure chamber 108 and within the print head fluidically connected to the valve 106 for at time period of T1 seconds (step 256), waits for a time period of T2 seconds without pumping (step 258), operates the pump 108 again in a positive (+) rotation direction at medium speed for a time period of T3 seconds (step 260) and disables the pump 108 (step 262). Optionally, the program may also issue a backflow warning or message (step 264) to indicate to a user that backflow has occurred. At step 264, preferably, when the pump is disabled, printing is stopped and the printer cannot be reactivated until the backflow issue is resolved.

In step 254, if ink backflow has not been detected, the program proceeds by checking if the value of a "purge phase 1" flag equals 1, indicating that a print head purge is required (step 266). If purge phase 1 flag=1, the program closes the valve 104 (step 268) and operates the pump 108 at a medium speed in a negative rotation direction (as indicated by the "−" sign) to lower the pressure within the pressure chamber 103 (step 270). The program then checks if the pressure level in the chamber 103 is greater than or equal to a set vacuum pressure level (step 272). If the pressure level in the chamber 103 is greater than or equal to the vacuum pressure level, the program continues to operate the pump 108 by returning control to step 272, to further decrease the pressure in the pressure chamber 103. The "vacuum pressure level" is a set or preset or programmed pressure value which is determined by the volume of the specific print head(s) fluidically coupled to the pressure controlling system, as explained in detail in Examples 1 and 2 hereinabove.

If the pressure level in the chamber 103 is smaller than the set vacuum pressure level, the program opens the valve 103 to allow the pressure within the print head(s) to decrease to the desired vacuum mode pressure as explained in detail hereinabove (step 274), sets the value of the phase 1 flag to one (step 276) and returns control to step 250.

In step 266, if the phase 1 purge flag is not equal to one, the program checks if the pressure level in the chamber 103 is larger than the set vacuum pressure level (step 278). The "vacuum pressure level" value is a set or preset or programmed pressure value that is determined by the volume of the specific print head which is fluidically coupled to the pressure controlling system, as explained in detail in Examples 1 and 2 hereinabove). If the pressure level in the pressure chamber 103 is larger than the vacuum pressure level, the program operates the pump at a medium speed in a negative (−) rotation direction to further reduce the pressure in the vacuum chamber 103 (step 280) and transfers control to step 278.

If the pressure level in the chamber 103 is not larger than the vacuum pressure level, the program checks whether the pressure level in the pressure chamber 103 is smaller than the vacuum pressure level (step 282).

If the pressure level in the pressure chamber 103 is smaller than the vacuum pressure level, the program operates the pump 108 at low speed in a positive rotation direction to increase the pressure level in the pressure chamber 103 (step 284) and returns control to step 282.

If the pressure level in the pressure chamber 103 is not smaller than the vacuum pressure level, the program transfers control to step 250.

In step 252 (of FIG. 10A), if a vacuum mode command has not been detected, the program checks if purge phase 1 flag=1 (step 286). If purge phase 1 flag=1, the program checks if the pressure level in the pressure chamber 103 is equal to or larger than the purge pressure level (step 288). If purge phase 1 flag=1, the program transfers control to step 250. If the value of purge phase 1 flag is not equal to 1, the program operates the pump 108 at medium speed in a positive rotation direction (+) to increase the pressure level within the pressure chamber 103 (step 290) and transfers control to step 288.

In step 286, if the Purge Phase 1 flag is not equal to one, the programs closes the valve 104 (step 292), operates the pump 108 at maximum speed in a positive (+) rotation direction (step 294) and checks if the pressure level in the pressure chamber 103 is larger than or equal to the purge pressure level (step 296). If the pressure level in the pressure chamber 103 is not larger than or equal to the purge pressure level, the program returns control to step 294 to continue operating the pump 108. If the pressure level in the pressure chamber 103 is larger than or equal to the purge pressure level, the program opens the valve 104 and sets phase 1 flag=1 (step 298) and then transfers control to step 250.

It is noted that in accordance with a specific exemplary embodiment of the method of FIGS. 10A-10B, the time intervals T1, T2 and T3 (of steps 256, 258 and 260, respectively) have the following values: T1=5 seconds, T2=30 seconds, and T3=15 seconds. While these specific values of the time intervals T1, T2 and T3, were found to be adequate for proper operation of the pressure controlling system 100 when it is fluidically connected with a specific print block with parameters as disclosed in EXAMPLE 1 hereinabove, these specific values are by no means obligatory to practicing the method and it should be realized that other different values of T1, T2 and T3 (lower and/or higher than the specific values given in the particular example disclosed herein) may be used in the program, depending, inter alia, on the print head(s) or print block(s) being used in conjunction with the pressure controlling system, the pump's, pumping capacity and other considerations. Adequate values for these parameters may be easily determined empirically by the person skilled in the art without undue experimentation.

It is further noted that for the specific peristaltic pump (the model WP11-N1/4(200)BA2G-BS material peristaltic pump) used in one specific exemplary embodiment of the vacuum controlling system 100 as disclosed hereinabove, the following pump speed ranges were found to be suitable for operation of the program when the pressure controlling system 10 was fluidically connected to a print head having the same volume and pressure parameters as disclosed in EXAMPLE 1 hereinabove:

Low Speed=0.3-0.4 RPS.
Medium speed=1.0-1.5 RPS.
High Speed=2.3-2.5 RPS.

However, these pump speed ranges are given by way of example only, are not obligatory, and may vary depending, inter alia, on the volume of the first compartment of the system being used, the total internal volume within the print head(s) being used (the second compartment volume), and the pumping capacity and other characteristics of the specific pump being used in the pressure controlling system.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A pressure controlling system for an inkjet printer, the system comprising:
    a pressure chamber having a volume;
    a pump fluidically connected to said pressure chamber and adapted for increasing the pressure within said pressure chamber by pumping air into said pressure chamber and for decreasing the pressure within said pressure chamber by pumping air out of said pressure chamber;
    a controllable three port two way valve having a first port controllably fluidically connectable to said pressure chamber, a second port controllably fluidically connectable to one or more inkjet print heads and a third port controllably fluidically connectable with atmospheric air; and
    a pressure sensor unit comprising one or more pressure sensors, said pressure sensor unit is in fluidic communication with said pressure chamber for sensing the pressure within said pressure chamber;
    wherein said pressure sensor unit is adapted for sending signals representative of the pressure within said pressure chamber to at least one processor/controller, wherein said pump is adapted to receive control signals from said at least one processor/controller for controlling the operation of said pump, wherein said valve is adapted for receiving control signals from said at least one processor/controller for controlling the operation of said valve; and
    wherein said processor/controller is configured to signal said pump to increase pressure in said pressure chamber while said first port is closed, and to decrease pressure in said pressure chamber while there is an open flow path between said first port and said second port.

2. The pressure controlling system according to claim 1, wherein said at least one processor/controller unit is selected from:
    at least one processor/controller included in said pressure controlling system and adapted to control the operation of said valve and of said pump, said at least one processor/controller is also adapted to communicate with at least a second processor/controller controlling the operation of one or more print heads of said printer for receiving command signals from said at least a second processor/controller,
    at least one processor/controller included in said printer and adapted to control the operation of said pressure controlling system and for controlling the operation of said one or more print heads of said printer, and
    a combination of at least one processor/controller included in said pressure controlling system and at least one processor/controller included in said printer and communicating with said at least one processor/controller of said pressure controlling system, said combination is adapted for operating said pump and said valve and for controlling the operation of said one or more print heads of said printer.

3. The pressure controlling system according to claim 1, wherein the pressure controlling system also includes a filter fluidically connected between said pump and the atmospheric air for filtering air entering said pump.

4. The pressure controlling system according to claim 1, wherein said second port of said valve is fluidically connected to said one or more inkjet print heads by one or more hollow conduits for controlling the pressure within said one or more print heads and wherein said pressure controlling system also includes an ink backflow detecting sensor for detecting backflow of ink from said one or more inkjet print heads through one or more hollow conduits before said ink enters said second port.

5. The pressure controlling system according to claim 4, wherein said one or more hollow conduits are transparent hollow conduits and wherein said ink backflow detecting sensor is an optical sensor.

6. The pressure controlling system according to claim 1, wherein said pump is a reversible peristaltic pump.

7. The pressure controlling system according to claim 1, wherein said pump includes a stepper motor.

8. The pressure controlling system according to claim 1, wherein said pressure sensing unit is selected from:
    a pressure sensing unit disposed within said pressure chamber, and
    a pressure sensing unit disposed outside said pressure chamber and fluidically connected to said pressure chamber through one or more hollow conduits connected to said one or more pressure sensors.

9. The pressure controlling system according to claim 1, wherein said pressure sensing unit comprises multiple pressure sensors, each pressure sensor of said multiple pressure sensors is adapted for sensing pressure is a sub-range of the full range of pressures achievable within said pressure chamber for increasing the dynamic range and/or the resolution of said pressure sensing unit.

10. The pressure controlling system according to claim 1, wherein said three port two way valve is a solenoid valve.

11. An inkjet printer, the printer comprising:
   the pressure controlling system according to claim 1; and
   at least one controllably movable inkjet print head, said at least one print head is fluidically connected to said pressure controlling system for controlling the pressure level within at least one internal ink reservoir disposed within said at least one print head.

12. The printer according to claim 11, wherein said at least one processor/controller unit is selected from:
   at least one processor/controller included in said pressure controlling system and adapted to control the operation of said valve and of said pump, said at least one processor/controller is also adapted to communicate with at least a second processor/controller controlling the operation of at least one print head of said printer, for receiving command signals from said at least a second processor/controller,
   at least one processor/controller included in said printer and adapted to control the operation of said pressure controlling system and for controlling the operation of said at least one print head of said printer, and
   a combination of at least one processor/controller included in said pressure controlling system and at least one processor/controller included in said printer and communicating with said at least one processor/controller of said pressure controlling system, said combination is adapted for operating said pump and said valve and for controlling the operation of said at least one print head of said printer.

13. The printer according to claim 11, wherein the pressure controlling system also includes a filter fluidically connected between said pump and the atmospheric air for filtering air entering said pump.

14. The printer according to claim 11, wherein said second port of said valve is fluidically connected to said at least one inkjet print head by a hollow conduit for controlling the pressure within said at least one print head and wherein said pressure controlling system also includes an ink backflow detecting sensor for detecting backflow of ink from said at least one inkjet print head through said hollow conduit before to said ink enters said second port.

15. The printer according to claim 14, wherein said hollow conduit is a transparent hollow conduit and wherein said ink backflow detecting sensor is an optical sensor.

16. The printer according to claim 11, wherein said pump is a reversible peristaltic pump.

17. The printer according to claim 11, wherein said pump includes a stepper motor.

18. The printer according to claim 11, wherein said pressure sensor unit is selected from:
   a pressure sensor unit disposed within said pressure chamber, and
   a pressure sensor unit disposed outside said pressure chamber and fluidically connected to said pressure chamber through one or more hollow conduits connected to said one or more pressure sensors.

19. The printer according to claim 11, wherein said pressure sensor unit comprises multiple pressure sensors, each pressure sensor of said multiple pressure sensors is adapted for sensing pressure is a sub-range of the full range of pressures achievable within said pressure chamber for increasing the dynamic range and/or the resolution of said pressure sensing unit.

20. The printer according to claim 11, wherein said three port two way valve is a solenoid valve.

21. The printer according to claim 11, wherein said ink jet printer is selected from a 2D inkjet printer and a 3D inkjet printer.

22. A method for controlling pressure in a print head of an inkjet printer comprising the pressure controlling system according to claim 1, the method comprises the steps of:
   receiving pressure related signals from said pressure sensing unit of said pressure controlling system, said pressure related signals represent the pressure level within said pressure chamber;
   receiving printing control signals for operating said print head;
   processing said pressure related signals and/or said control signals to provide pump control signals to said pump and/or valve control signals to said valve.

23. The method according to claim 22, wherein said step of processing comprises the steps of:
   receiving a vacuum mode control signal,
   closing said valve to fluidically connect said print head to the atmosphere and to disconnect said pressure chamber from the atmosphere,
   operating said pump to reduce the pressure within said pressure chamber to a vacuum mode pressure level, and
   opening said valve to fluidically connect said print head to said pressure chamber.

24. The method according to claim 23, wherein said vacuum mode pressure level is a set or preset pressure level.

25. The method according to claim 22, wherein said step of operating said pump comprises the step of closing said valve to allow the pressure within said pressure chamber to equilibrate with atmospheric pressure prior to said step of operating said pump.

26. The method according to claim 22, wherein said step of processing comprises:
   receiving a purging control signal for performing purging of said print head,
   closing said valve to allow the pressure within said print head to equilibrate with atmospheric pressure,
   operating said pump to increase the pressure within said pressure chamber to a purge pressure level, and
   opening said valve to fluidically disconnect said print head from the atmosphere and to fluidically connect said pressure chamber to said print head, for purging said print head.

27. The method according to claim 26, wherein said purge pressure level is a set or preset value.

28. The method according to claim 26, wherein said step of processing also comprises reversing the direction of pumping of said pump after said purging is completed to reduce the pressure within said pressure chamber to a level equal to or smaller than a vacuum mode pressure level.

29. The method according to claim 22, wherein said step of processing also comprises the step of checking if ink backflow is detected and if ink backflow has been detected operating said pump to increase pressure within sais pressure chamber for preventing ink from entering said pressure controlling system.

30. The method according to claim 29, wherein said step of checking also includes the step of disabling said pump after said preventing.

31. The method according to claim 30, wherein said step of checking also includes the step of outputting an ink backflow message.

32. A pressure controlling system for controlling pressure in an inkjet print head, the system comprising:
- a three port two way valve having a first port controllably fluidically connectable to a pressure chamber, a second port controllably fluidically connectable to the inkjet print head, and a third port controllably fluidically connectable with atmospheric air; and
- a controller configured for controlling said valve to form either a first flow path or a second flow path within said valve;
- said first flow path is disconnected from said atmospheric air, and connects said pressure chamber and said inkjet print head, and
- said second flow path is disconnected from said pressure chamber, and connects between said inkjet print head and said atmospheric air;
- wherein said controller is also configured to operate a pump to increase pressure in said pressure chamber while said second flow path is formed, and to decrease pressure in said pressure chamber while said first flow path is formed.

\* \* \* \* \*